(12) United States Patent
Sato et al.

(10) Patent No.: US 9,568,687 B2
(45) Date of Patent: Feb. 14, 2017

(54) PLUG FOR OPTICAL CONNECTOR, JACK FOR OPTICAL CONNECTOR, AND OPTICAL CONNECTOR

(71) Applicant: YOKOWO CO., LTD., Kita-ku, Tokyo (JP)

(72) Inventors: Kenichi Sato, Tokyo (JP); Hideki Kamitsuna, Tokyo (JP); Satomi Tanaka, Tokyo (JP); Ryo Nagase, Chiba (JP)

(73) Assignee: Yokowo Co., Ltd., Tokyo (JP)

( * ) Notice: Subject to any disclaimer, the term of this patent is extended or adjusted under 35 U.S.C. 154(b) by 0 days.

(21) Appl. No.: 14/431,920

(22) PCT Filed: Aug. 28, 2013

(86) PCT No.: PCT/JP2013/073037
§ 371 (c)(1),
(2) Date: Mar. 27, 2015

(87) PCT Pub. No.: WO2014/050416
PCT Pub. Date: Apr. 3, 2014

(65) Prior Publication Data
US 2015/0241640 A1     Aug. 27, 2015

(30) Foreign Application Priority Data

Sep. 28, 2012  (JP) ................................ 2012-215624
Apr. 15, 2013  (JP) ................................ 2013-085141

(51) Int. Cl.
*G02B 6/38* (2006.01)

(52) U.S. Cl.
CPC ............... *G02B 6/3869* (2013.01); *G02B 6/38* (2013.01); *G02B 6/381* (2013.01)

(58) Field of Classification Search
None
See application file for complete search history.

(56) References Cited

U.S. PATENT DOCUMENTS 5,459,805 A    10/1995  Foster
5,940,560 A *   8/1999  De Marchi ........ C07K 14/3156
                                                        385/58

(Continued)

FOREIGN PATENT DOCUMENTS

CN        101852897 A       10/2010
JP         7-502836          3/1995

(Continued)

OTHER PUBLICATIONS

International Search Report for International Application No. PCT/JP2013/073037 mailed Oct. 15, 2013 (4 pages).

(Continued)

*Primary Examiner* — Rhonda Peace
(74) *Attorney, Agent, or Firm* — Carrier Blackman & Associates, P.C.; Joseph P. Carrier; Anne G. Sabourin

(57) ABSTRACT

The present invention is directed to an optical connector that is provided with a plug and a jack for the optical connector. A lens (plug-side optical coupling part) that optically couples light transmitted inside an optical fiber held by the plug, to a jack, is disposed on a side surface of the plug. A lens (jack-side optical coupling part) that optically couples light transmitted inside an optical fiber held by the jack, to the plug, is disposed on an inner side surface of the jack.

19 Claims, 25 Drawing Sheets

(56) References Cited

U.S. PATENT DOCUMENTS

| | | | | |
|---|---|---|---|---|
| 6,375,362 B1* | 4/2002 | Heiles | | G02B 6/3827 385/135 |
| 6,939,057 B2* | 9/2005 | Beier | | G02B 6/421 385/89 |
| 7,039,276 B2* | 5/2006 | Aldridge | | B64D 43/00 385/39 |
| 7,168,860 B2* | 1/2007 | Kim | | G02B 6/3508 385/55 |
| 7,488,122 B2* | 2/2009 | Hashimoto | | G02B 6/4277 385/49 |
| 7,775,725 B2 | 8/2010 | Grinderslev | | |
| 7,802,927 B2* | 9/2010 | Benjamin | | G02B 6/25 385/31 |
| 8,235,604 B2* | 8/2012 | Suzuki | | G02B 6/4249 385/14 |
| 8,262,294 B2* | 9/2012 | Marcouiller | | G02B 6/3849 385/53 |
| 8,376,633 B2* | 2/2013 | Nishimura | | G02B 6/4202 385/32 |
| 8,573,861 B2* | 11/2013 | Terlizzi | | G02B 6/3817 385/88 |
| 8,579,518 B2* | 11/2013 | Isenhour | | G02B 6/3825 385/55 |
| 8,620,122 B2* | 12/2013 | Meadowcroft | | G02B 6/4286 385/14 |
| 8,734,024 B2* | 5/2014 | Isenhour | | G02B 6/3886 385/57 |
| 9,097,859 B2* | 8/2015 | Wu | | G02B 6/32 |
| 2002/0136498 A1* | 9/2002 | Aldridge | | B64D 43/00 385/52 |
| 2004/0114866 A1* | 6/2004 | Hiramatsu | | G02B 6/4292 385/39 |
| 2004/0114875 A1* | 6/2004 | Mattsen | | G02B 6/125 385/53 |
| 2004/0247257 A1* | 12/2004 | Beier | | G02B 6/421 385/89 |
| 2006/0210225 A1 | 9/2006 | Fujiwara | | |
| 2007/0292081 A1* | 12/2007 | Hashimoto | | G02B 6/4277 385/52 |
| 2008/0025674 A1* | 1/2008 | Sasaki | | G02B 6/423 385/88 |
| 2009/0010598 A1* | 1/2009 | Feeney | | G02B 6/3817 385/51 |
| 2009/0269004 A1* | 10/2009 | Ono | | G02B 6/4228 385/14 |
| 2009/0297099 A1* | 12/2009 | Benjamin | | G02B 6/25 385/32 |
| 2013/0136400 A1* | 5/2013 | Isenhour | | G02B 6/3886 385/79 |
| 2014/0099060 A1* | 4/2014 | Danley | | G02B 6/4214 385/38 |
| 2015/0241640 A1* | 8/2015 | Sato | | G02B 6/38 385/61 |

FOREIGN PATENT DOCUMENTS

| | | |
|---|---|---|
| JP | 11-109189 | 4/1999 |
| JP | 2001-024590 | 1/2001 |
| JP | 2004-348123 | 12/2004 |
| JP | 2009-276668 | 11/2009 |
| JP | 2012-068535 | 4/2012 |

OTHER PUBLICATIONS

International Written Opinion for International Application No. PCT/JP2013/073037 mailed Oct. 15, 2013 (5 pages).

Office Action dated Jul. 4, 2016, issued in the corresponding Chinese Patent Application 201380049733.8.

\* cited by examiner

PLUG FOR OPTICAL CONNECTOR, JACK FOR OPTICAL CONNECTOR, AND OPTICAL CONNECTOR

This application is a U.S. National Stage Application under 35 U.S.C. §371 of International Patent Application No. PCT/JP2013/073037 filed 28 Aug. 2013, which claims the benefit of priority to Japanese Patent Application No. 2012-215624 filed 28 Sep. 2012 and Japanese Patent Application No. 2013/085141 filed 15 Apr. 2013, the disclosures of all of which are hereby incorporated by reference in their entireties. The International Application was published in Japanese on 3 Apr. 2014 as WO 2014/050416.

TECHNICAL FIELD

The present invention relates to a technique for a plug-jack type optical connector.

BACKGROUND

In recent years, technological development for optical cables and optical connectors has been actively carried out. For example, Patent Literature 1 discloses an optical connector in which, when the plug is inserted into the optical jack (jack) to be engaged with it, the tip of the plug faces the optical element built into the innermost portion of the body (plug accommodation section) of the optical jack in which the plug is accommodated. In other words, transmission of light conducted in the optical connector in Patent Literature 1 is conducted between the innermost portion of the plug accommodation section of the optical jack and the tip of the plug inserted into the plug accommodation section.

CITATION LIST

Patent Literature

CITATION LIST

Patent Literature

Patent Literature 1: Japanese Patent Application Publication No. H11-109189

SUMMARY OF INVENTION

Technical Problem

When an optical connector is used, foreign materials such as foreign particles, dust or mote are sometimes mixed into a plug accommodation section of a jack to exert influence on transmission of light conducted in the optical connector. Herein, according to the configuration in Patent Literature 1, there is a possibility that such foreign materials gain entry to the neighborhood of the optical element located at the innermost portion of the plug accommodation section and the plug is inserted to push the foreign materials inward. Consequently, things such as fault in the transmission of light (interruption of optical signals or the like) and/or damage of the optical element may be caused.

In order to avoid the above influence, persons having ordinary skill in the art of optical connectors have customarily cleaned the plug and the jack every time the plug is inserted or removed. Moreover, at a time of non-use of the optical connector, the persons have attached protection caps to the plug and the jack. However, it is too cumbersome for a general user having no basic knowledge of an optical connector to take these measures, and accordingly, it is not easy to introduce the optical connector into a mobile terminal or the like used indoors and outdoors by the user.

In view of these circumstances, the present invention makes it an object to considerably reduce a possibility that foreign materials exert influence on transmission of light conducted in an optical connector.

Solution to Problem

In order to attain the above object, an optical connector according to the present invention is provided with a plug and a jack for the optical connector.

A plug-side optical coupling part that optically couples light transmitted inside a plug-side optical waveguide unit held by the plug, to the jack, is disposed on a side surface of the plug.

A jack-side optical coupling part that optically couples light transmitted inside a jack-side optical waveguide unit held by the jack, to the plug, is disposed on an inner side surface of the jack.

Details will be described later.

Advantageous Effects of Invention

The invention makes it possible to considerably reduce a possibility that foreign materials exert influence on transmission of light conducted in the optical connector.

BRIEF DESCRIPTION OF DRAWINGS

FIG. 27B corresponds to a view when viewing the plug and the jack at a time of engagement, from up above; and FIG. 27C is a view when viewing the plug from the front.

FIGS. 28A and 28B are views showing another example of the shutter provided in the plug, in which FIG. 28A is a view when viewing the shutter from the front, and FIG. 28B is a cross-sectional view taken along the line B-B in FIG. 28A.

FIG. 31B is a schematic view when viewing the plug and the jack in FIG. 31A, from the rear.

FIG. 32B is a schematic view when viewing the plug and the jack in FIG. 32A, from the rear; and FIG. 32C shows another example of the plug in FIGS. 32A and 32B.

FIG. 33B is a schematic view when viewing the plug and the jack after the insertion in FIG. 33A, from the rear; and FIG. 33C shows another example of the plug and the jack in FIGS. 33A and 33B.

FIG. 34B is a schematic view when viewing the plug and the jack at a time of engagement in FIG. 34A, from the rear.

DESCRIPTION OF EMBODIMENTS

Hereinafter, embodiments of the present invention will be described in detail with reference to the drawings. Note that for convenience of explanation, in some cases, a direction in which a plug is inserted into a jack is called "front" or "inward and a direction in which the plug is removed from the jack is called "rear". Up-down and right-left directions are given in accordance with each of the figures. Moreover, the term "perpendicular" includes the meaning of "nearly perpendicular", and the term "parallel" includes the meaning of "nearly parallel".

(Overall Configuration)

Figure 1:
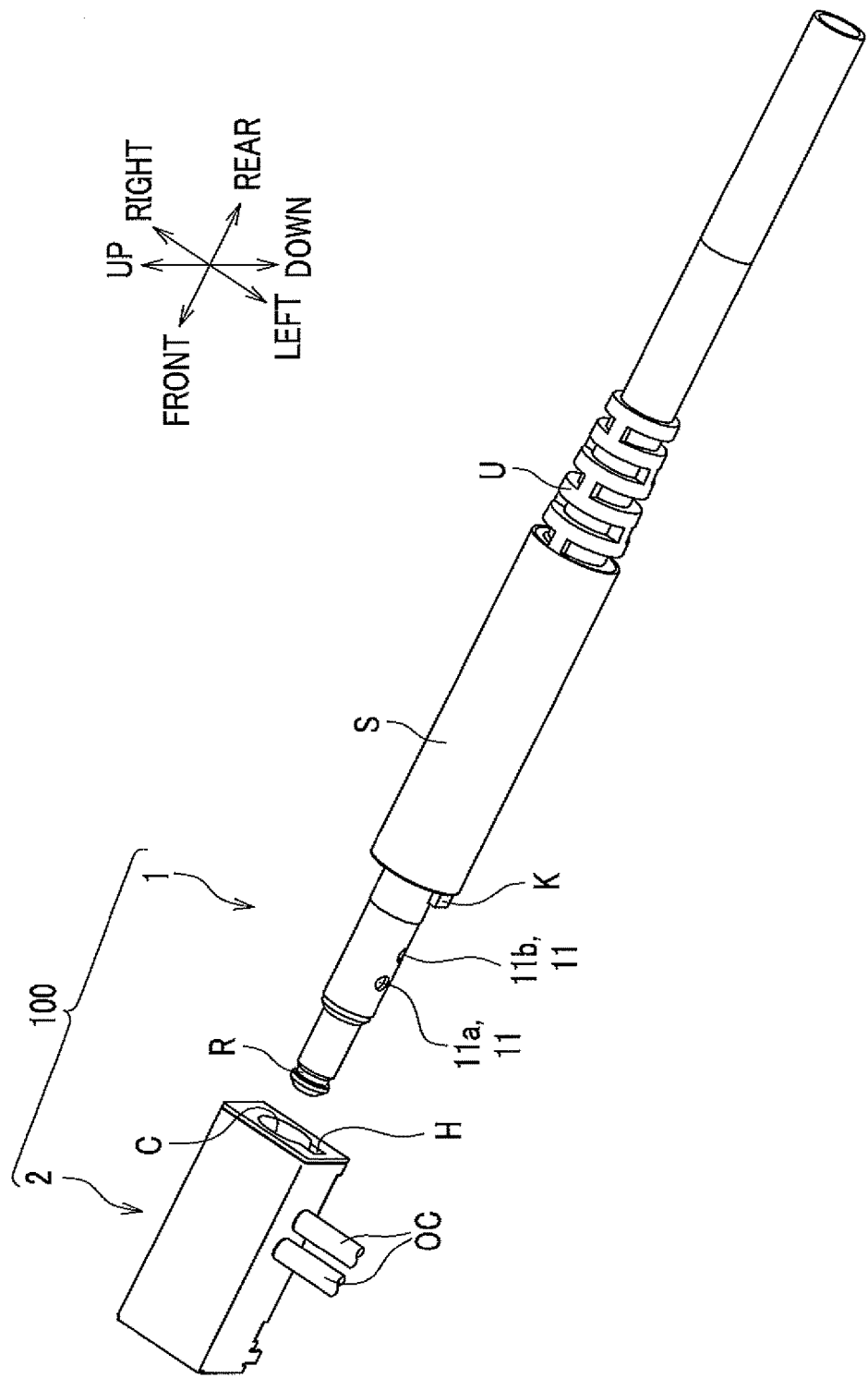
FIG. 1 is an overall perspective view showing an example of an optical connector provided with a plug and a jack at a time of non-engagement.

Referring to FIG. 1, an optical connector 100 according to the present embodiment (hereinafter simply referred to as an "optical connector") is provided with a plug 1 that is made of resin and has the form of a nearly circular column, and a jack 2 that has the form of a nearly rectangular parallelepiped. The plug 1 includes a head part which is inserted into the inside of the jack 2, a support part S, and a cable protection part U. On a side surface of the head part of the plug 1, two lenses (optical coupling parts) 11a (11), 11b (11) are provided and a removal preventive groove R is formed. The lenses 11 will be described later. Moreover, a key K is formed on the support part S. On the other hand, formed in the jack 2 is a plug accommodation section C which forms a hole for accommodating the plug 1 to be engaged therewith. FIG. 1 shows an entrance of the plug accommodation section C. Note that optical fiber cables OC are connected to an outer left side surface of the jack 2.

The removal preventive groove R is a groove (engaging groove) that is formed along the entire circumferential direction near a tip of the plug 1. When an engaging portion for removal prevention (not shown), which is provided near an innermost portion of the plug accommodation section C of the jack 2, is engaged with the removal preventive groove R at a time of engagement, unintended removal of the plug 1 can be prevented. Note that the above engaging portion for removal prevention can be configured, for example, as a leaf spring that ranges over almost the circumferential direction of the plug accommodation section C.

The support part S is a member that is gripped by a user and holds a body of the plug 1 (constituent elements of the plug 1 other than the support part S) and a cable extending from the plug 1 to the rear direction.

The cable protection part U is fixed to the cable and restricts movement of the support part S to the rear direction.

Figure 2:
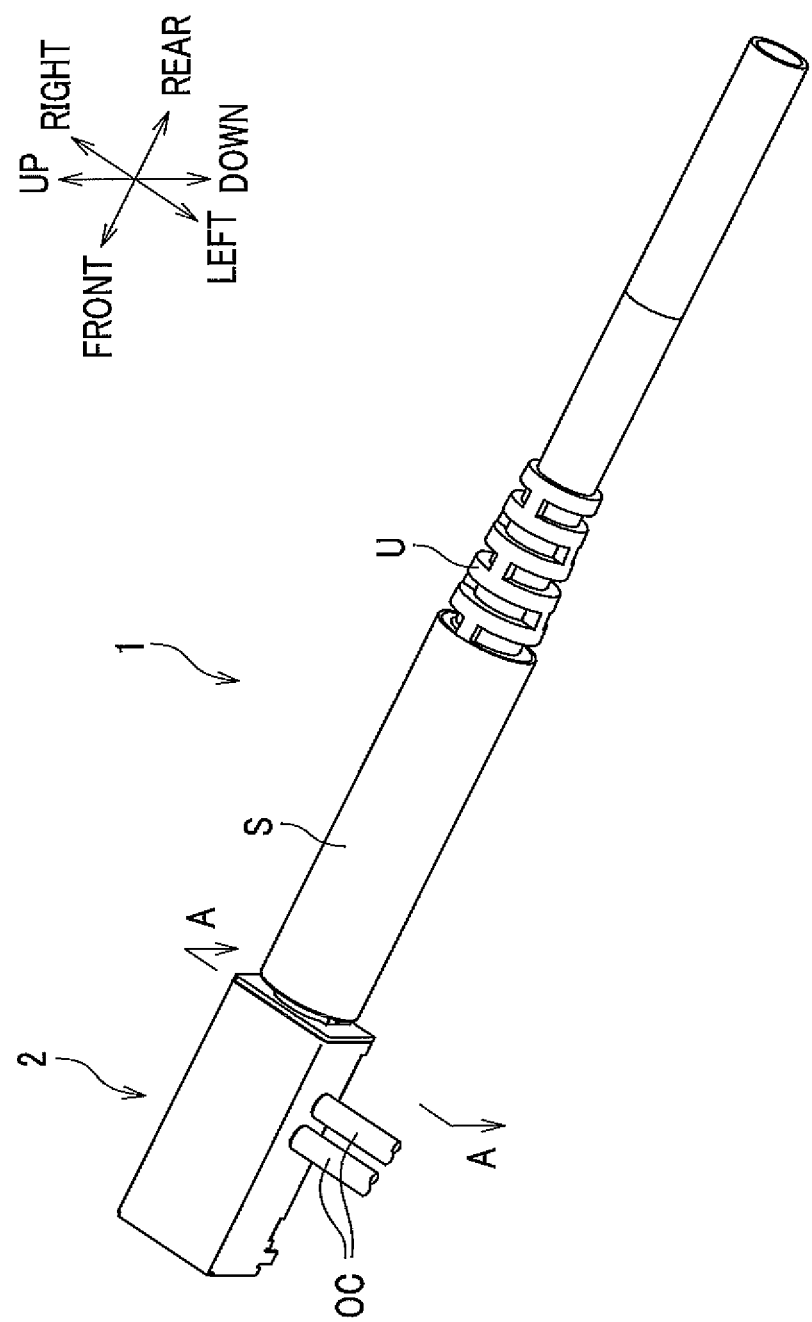
FIG. 2 is an overall perspective view showing an example of the optical connector provided with the plug and the jack at a time of engagement.

The key K is formed on a front end face of the support part S and has a configuration which is engaged with a key groove H of the jack 2. When the plug 1 is fitted into the jack 2 (see FIG. 2) to allow the key K to be engaged with the key groove H, a position around the axis in an insertion/removal direction (front-rear direction) of the plug 1 relative to the jack 2 is determined.

(Optical Coupling Part and Optical Fiber)

Figure 3:
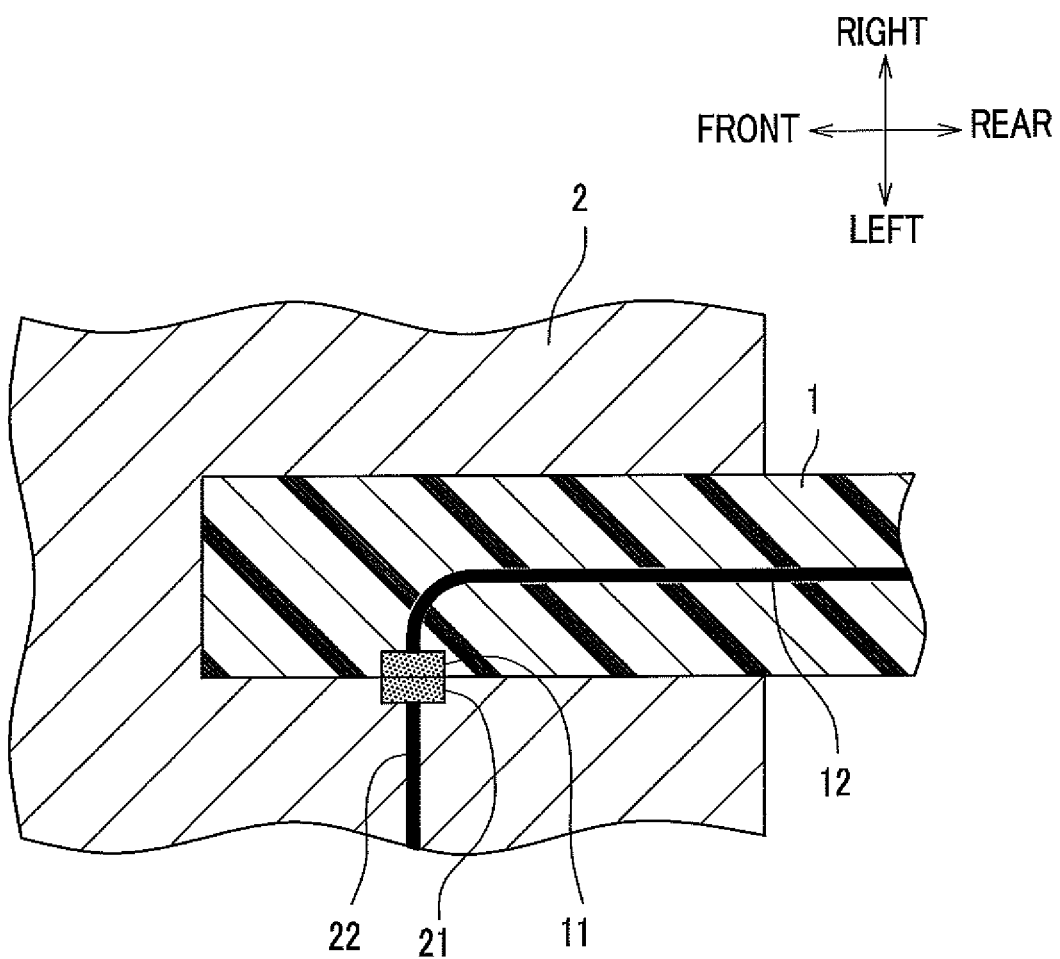
FIG. 3 is a cross-sectional view taken along the line A-A in FIG. 2, which is a view schematically showing a cross-section when viewing an example of the plug and the jack at a time of engagement, from up above.

With reference to FIG. 3, description will be given of a lens (plug-side optical coupling part) and an optical fiber 12 (plug-side optical waveguide unit) provided in the plug 1, and a lens 21 (jack-side optical coupling part) and an optical fiber 22 (jack-side optical waveguide unit) provided in the jack 2. Note that for convenience of explanation, FIG. 3 shows only one lens 11 provided in the plug 1 and only one optical fiber 12 held by the plug 1, and also shows only one lens 21 provided in the jack 2 and only one optical fiber 22 held by the jack 2. Moreover, the optical fibers 12, 22 pass through holes formed inside the plug 1 and inside the jack 2, respectively, and are fixed to the plug 1 and the jack 2 using an adhesive or the like.

The lenses 11, 21 are adapted to optically couple light transmitted inside the optical fiber 12 and light transmitted inside the optical fiber 22 to each other. "Optical coupling" in the present embodiment means performing transmission of light via the respective optical coupling parts of the plug and the jack that are engaged with each other. The lens 11 efficiently optically couples the light transmitted inside the optical fiber 12 to the jack 2, and the lens 21 efficiently optically couples the light transmitted inside the optical fiber 22 to the plug 1. Providing the lenses in the optical coupling parts can enhance the function of optical coupling.

The lenses 11, 21 are fixed to the plug 1 and the jack 2 using an adhesive or the like, respectively. It is preferable that the lenses 11, 21 can convert the light transmitted into a collimated light. In FIG. 3, an outer surface of the lens 11 and a side surface of the plug 1 are flush with each other. Moreover, an outer surface of the lens 21 and an inner side surface of the jack 2 (namely, the surface of the plug accommodation section C) are flush with each other.

An end portion of the optical fiber 12 may be in contact with the lens 11, or may be spaced from the lens 11 so that transmission of light is effectively realized. Note that in FIG. 3, the optical fiber 12 extending along the front-rear direction inside the plug 1 having the form of a nearly circular column is bent to the left direction to bring the end portion of the optical fiber 12 into contact with the lens 11.

Figure 13:
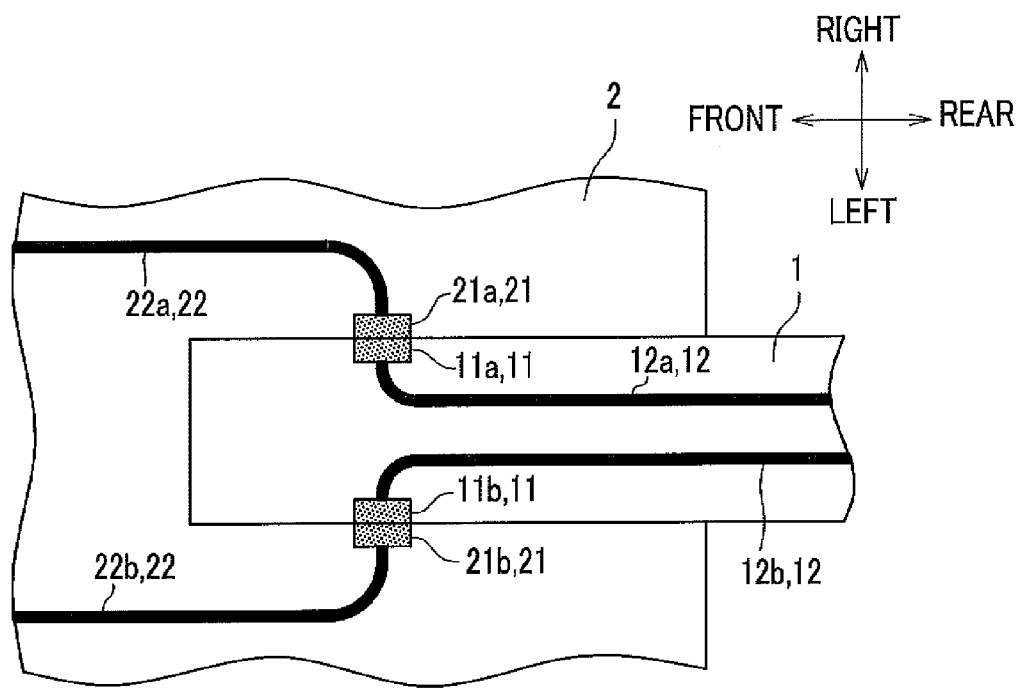
FIG. 13 is a schematic view when viewing an example from up above, in which the plug and the jack at a time of engagement hold a plurality of optical fibers and a plurality of optical coupling parts, respectively.

An end portion of the optical fiber 22 may be in contact with the lens 21, or may be spaced from the lens 21 so that transmission of light is effectively realized. Note that in FIG. 3, the optical fiber 22 is disposed linearly in the right-left direction inside the jack 2, but as shown in FIG. 13, a configuration may be adopted in which the optical fiber 22 is bent.

The lens 11 is disposed on the side surface (left side surface in FIG. 3) of the plug 1. Also, the lens 21 is disposed on the inner side surface of the jack 2, and the position around the axis of the lens 21 can be matched with that of the lens 11 by the key K and the key groove H at a time of engagement. Thus, the configuration in which the lenses are disposed on the side surface and the inner side surface is the greatest feature of the present invention which is not found in a conventional technique. Note that the positioning in the axial direction (front-rear direction) of the lens 11 and the lens 21 is performed by pressing the tip of the plug 1 against the innermost portion of the plug accommodation section C of the jack 2.

A conventional technique has adopted a configuration in which optical coupling is conducted between the tip of the plug and the innermost portion of the plug accommodation section of the jack. Accordingly, most of foreign materials which have been mixed into the plug accommodation section of the jack are sometimes accumulated in the innermost portion of the plug accommodation section to thereby block the optical coupling to exert a significant influence on the transmission of light.

According to the configuration of the present embodiment, the lens 21 is disposed at a position away from the innermost portion of the jack 2 and on the inner side surface of the jack 2. More specifically, the lens 21 is located away from the innermost portion of the jack 2 in which foreign materials are easy to be accumulated, and the plug insertion/removal direction (front-rear direction) which is an entry direction of foreign materials and the surface of the lens 21 become parallel to each other. Accordingly, the configuration is realized in which foreign materials are hardly accumulated on or adhere to the lens surface at a time of non-engagement as compared to the conventional technique. On the other hand, at a time of engagement, since the lens 11 is positioned away from the innermost portion of the jack 2, the lens 11 is kept away by a predetermined distance from the innermost portion in which foreign materials are accumulated. Moreover, when the plug 1 is inserted into the jack 2, the tip of the head part of the plug 1 pushes the foreign materials which have been mixed into any region in the plug accommodation section C, toward the innermost portion, thereby allowing the foreign materials to be away from the lenses 11, 21 by the predetermined distance. As a result, the foreign materials are not likely to come close to the lenses 11, 21 and thus a possibility can be considerably reduced that the foreign materials exert influence on the transmission of light conducted in the optical connector. The same also applies to a case where the plug 1 is removed from the jack 2. Accordingly, unlike the conventional technique, it eliminates the need for cleaning of the optical connector at a time of insertion/removal of the plug 1, and/or attachment and detachment of protection caps to and from the optical connector, and thus even a user having no basic knowledge of optical connectors can easily treat the optical connector. Therefore, the optical connector can be easily introduced into a device such as a mobile terminal that is used under the environment in which plenty of foreign materials such as dust or mote exist, regardless of indoors or outdoors.

Figure 4:
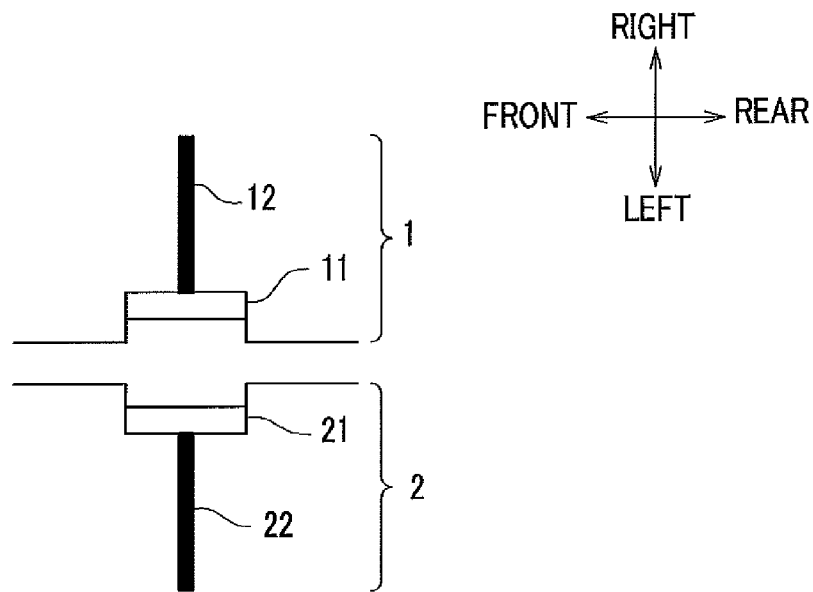
FIG. 4 is a schematic view showing details of an example of an optical coupling part.

The optical coupling part can take various forms. For example, as shown in FIG. 4, the outer surface of the lens 11 may be located on the inside of the side surface of the plug 1 to form a recessed portion, and the outer surface of the lens 21 may be located on the inside of the inner side surface of the jack 2 to form a recessed portion. As long as a sufficient optical coupling can be realized, a gap may be formed between the lens 11 and the lens 21.

Figure 5:
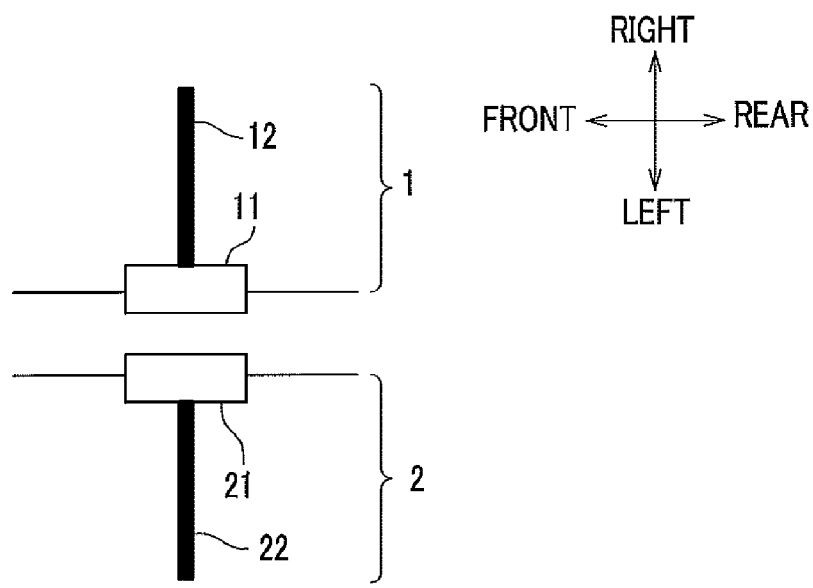
FIG. 5 is a schematic view showing details of another example of the optical coupling part.

Moreover, as shown in FIG. 5, the outer surface of the lens 11 may be located on the outside of the side surface of the plug 1 to form a projecting portion, and the outer surface of the lens 21 may be located on the outside of the inner side surface of the jack 2 (on the side occupied by the plug accommodation section C; the right side in FIG. 5) to form a projecting portion. This configuration with the lenses 11, 21 projecting makes it possible to rub the lenses 11, 21 with each other at a time of engagement and to certainly remove foreign materials adhering to the lenses 11, 21.

Figure 6:
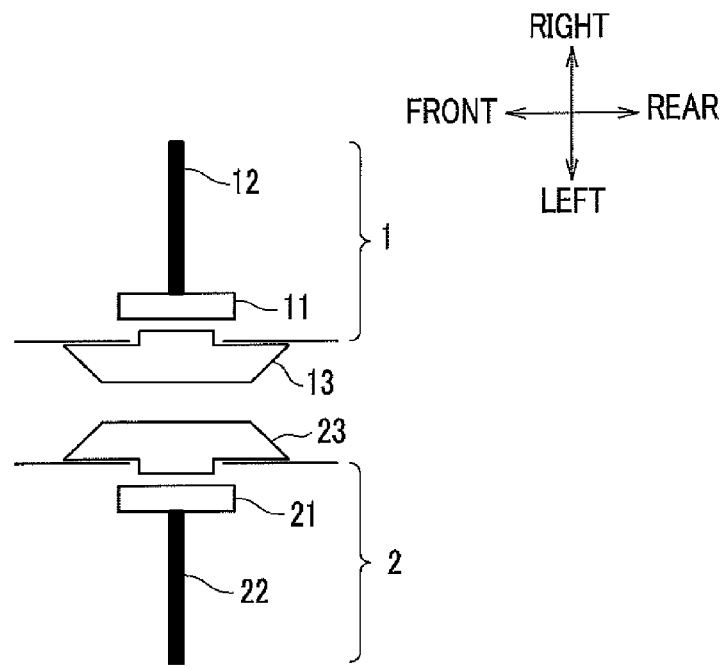
FIG. 6 is a schematic view showing details of still another example of the optical coupling part.

Further, as shown in FIG. 6, the optical coupling part of the plug 1 may have a protection part 13 (plug-side protection part) that protects the lens 11, and the optical coupling part of the jack 2 may have a protection part 23 (jack-side protection part) that protects the lens 21. With the protection parts 13, 23, the lenses 11, 21 can be certainly prevented from damages. The protection parts 13, 23 are fixed to the plug 1 and the jack 2 using an adhesive or the like, respectively. The protection parts 13, 23 can be made from a material which allows the light transmitted inside the optical fibers 12, 22 to transmit therethrough and is preferably harder than the lenses. This prevents the optical coupling of the optical connector from being blocked by the protection parts 13, 23.

The protection part 13 may be located on the outside of the side surface of the plug 1 to form a projecting portion, and the protection part 23 may be located on the outside of the inner side surface of the jack 2 to form a projecting portion. This configuration with the protection parts 13, 23 projecting makes it possible to rub the protection parts 13, 23 with each other at a time of engagement and to certainly remove foreign materials adhering to the protection parts 13, 23.

Figure 7:
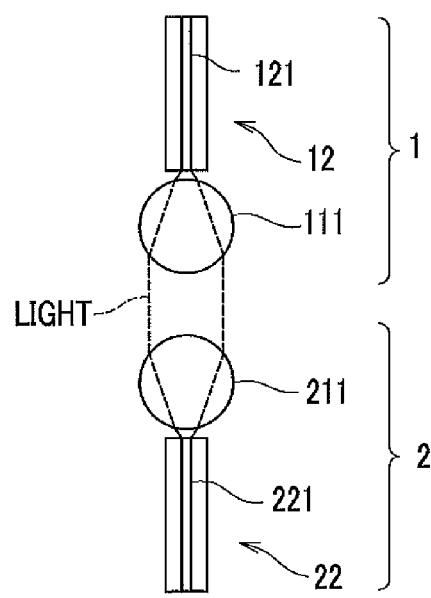
FIG. 7 is a schematic view for explaining a function of the optical coupling part.

It is greatly useful for the optical coupling part to have a function of magnifying a diameter of light emitted from the optical fiber. FIG. 7 illustrates a configuration in which a ball lens 111 serving as the optical coupling part provided in the plug 1 is spaced from the end portion of the optical fiber 12 and a ball lens 211 serving as the optical coupling part provided in the jack 2 is spaced from the end portion of the optical fiber 22.

The ball lens 111 magnifies a diameter of transmitted light emitted from a core 121 of the optical fiber 12 to approximately a diameter of the lens and converts the magnified light into a collimated light. The magnified collimated light is collected by the ball lens 211 into a core 221 of the optical fiber 22.

Thus magnifying the diameter of transmitted light can ease the accuracy of alignment at a time of engagement of the optical coupling parts with each other. Also, even if foreign materials adhere to the ball lens, a possibility can be reduced that the transmission of light is blocked by the foreign materials. Note that the distance between the optical fiber and the lens (ball lens), the focal length and shape of the lens, and the like are designed in consideration of NA (Numerical Aperture) of the optical fiber so that an intended diameter of transmitted light can be realized. Moreover, an objective lens or the like other than the ball lens may be employed as a lens for producing a collimated light.

Figure 8:
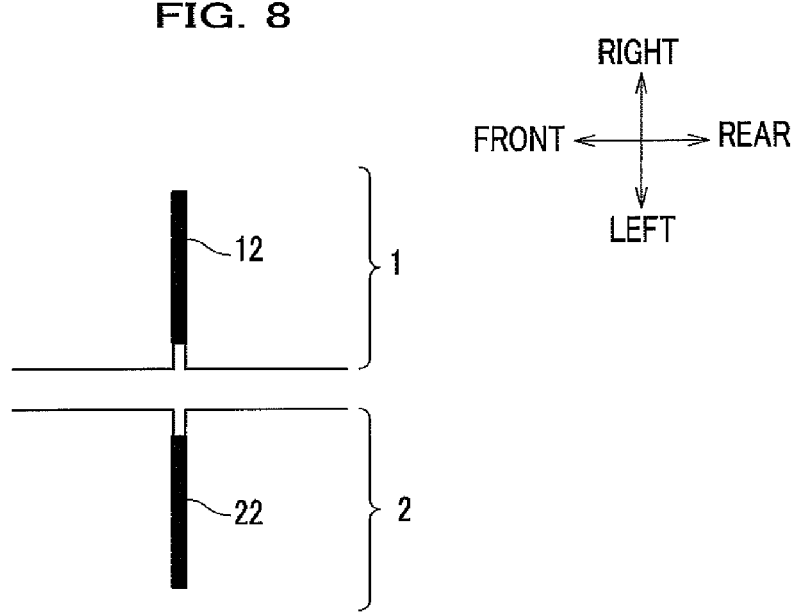
FIG. 8 is a schematic view showing details of still another example of the optical coupling part.

On the other hand, as shown in FIG. 8, the optical coupling part can also be configured without providing the lens 11 and the lens 21, only by the end portion of the optical fiber 12 and the end portion of the optical fiber 22. The end portion of the optical fiber 12 may be located on the inside of the side surface of the plug 1 to form a recessed portion, and the end portion of the optical fiber 22 may be located on the inside of the inner side surface of the jack 2 to form a recessed portion. This configuration makes it possible to simplify designing of the optical coupling part and to decrease at least one of the component and the number of implementation to effect cost reduction. Note that the end portion of the optical fiber 12 may be flush with the side surface of the plug 1 or project outwardly from the side surface of the plug 1, or may be positioned near the side surface of the plug 1. The end portion of the optical fiber 22 may be flush with the inner side surface of the jack 2 or project outwardly from the inner side surface of the jack 2, or may be positioned near the inner side surface of the jack 2.

Figure 9:
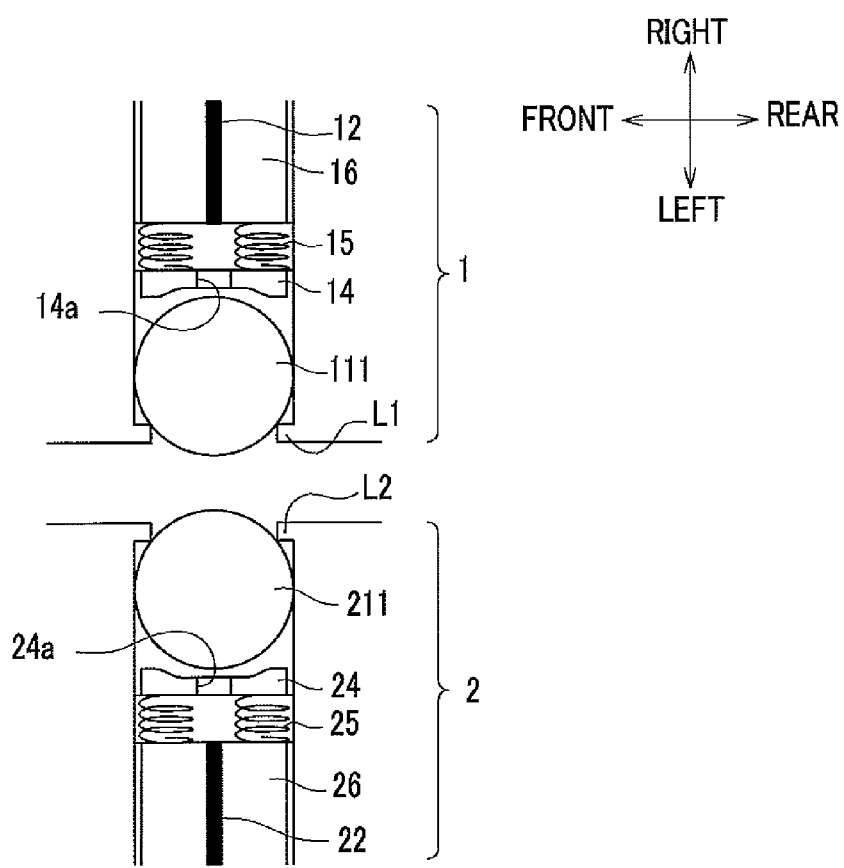
FIG. 9 is a schematic view showing details of still another example of the optical coupling part.

FIG. 9 shows an example of a specific configuration of the optical coupling part. The optical coupling part of the plug 1 is provided with a ball lens 111 (see FIG. 7), a seat member 14, and two springs 15. The optical coupling part of the jack 2 is provided with a ball lens 211 (see FIG. 7), a seat member 24, and two springs 25. Note that FIG. 9 illustrates a ferrule 16 that holds the optical fiber 12 and is fixed to the plug 1, and a ferrule 26 that holds the optical fiber 22 and is fixed to the jack 2.

The seat member 14 supports the ball lens 111 to the left direction (outward in the direction perpendicular to the front-rear direction: outward in the radial direction of the plug 1) so that the ball lens 111 rolls smoothly. Formed in the center of the seat member 14 is an aperture 14a that is along the right-left direction (the direction perpendicular to the front-rear direction), which blocks no optical coupling.

The spring 15 is disposed between the ferrule 16 and the seat member 14 and resiliently supports the seat member 14 to the left direction.

Formed on the side surface of the plug 1 is a stopper (latch portion) L1 that forms a flange extending from an end portion of an inner wall portion of a hole formed for the optical fiber 12 inward in the radial direction of the hole. The stopper L1 latches together the ball lens 111 from the left direction (outward in the direction perpendicular to the front-rear direction) to prevent the ball lens 111 from popping out of the hole. At a time of non-insertion of the plug 1, a portion of the ball lens 111 is exposed to the outside of the side surface of the plug 1. At a time of insertion/removal of the plug 1, the degree of exposure of the ball lens 111 varies by urging action of the spring 15, depending on the gap between the side surface of the plug 1 and the inner side surface of the jack 2. Also, a portion of the ball lens 111 rubs to roll on the inner side surface of the jack 2. Even where foreign materials have adhered to the ball lens 111, the foreign materials are moved to the position of the stopper L1 by rolling of the ball lens 111 to be eventually removed.

By the rolling of the ball lens 111, not only foreign materials having adhered to the ball lens 111, but also foreign materials having existed in the plug accommodation section C, can be expected to be removed. This is realized in a case where the foreign materials having existed in the plug accommodation section C adhere to the ball lens 111 with the rolling of the ball lens 111. Moreover, scratches on the surface of the ball lens 111 that are likely to result from rubbing of the ball lens 111 do not concentrate on one place but disperse on the ball lens 111. As a result, deterioration in the optical transmission characteristics of the optical connector can be considerably suppressed. Also, even where the gap between the side surface of the plug 1 and the inner side surface of the jack 2 is extremely small, a pressure at a time of contact of the ball lens 111 with the jack 2 is reduced because the spring 15 contracts. Consequently, rubbing at high pressure of the ball lens 111 can be avoided, the high pressure being generated by swiftly inserting the plug 1 and being likely to give a great scratch.

The form of the stopper L1 is not limited to the form shown in FIG. 9 and may be, for example, a form conforming to the form of the ball lens 111. Also, as for the spring 15, only one spring may be provided, or three or more springs may be provided.

Note that the seat member 24 and an aperture 24a formed therein, and the springs 25, which constitute the optical coupling part of the jack 2, are similar to the seat member 14, the aperture 14a and the springs 15 in the optical coupling part of the plug 1, and the optical coupling part of the jack 2 functions in the same way as the optical coupling part of the plug 1. Moreover, a stopper L2 of the jack 2 functions in the same way as the stopper L1 of the plug 1. Accordingly, explanation about the jack 2 will be omitted.

Both of the plug 1 and the jack 2 do not necessarily include the same configuration as illustrated in FIG. 9. For example, the optical coupling part shown in FIG. 9 may be applied to only the jack 2, and the plug 1 may adopt the configuration of the optical coupling part shown in FIG. 4, FIG. 5, FIG. 6 and FIG. 7. Alternatively, the optical coupling part shown in FIG. 9 may be applied to only the plug 1, and the jack 2 may adopt the configuration of the optical coupling part shown in FIG. 4, FIG. 5, FIG. 6 and FIG. 7. These configurations produce advantages of downsizing and cost reduction.

Figure 10:
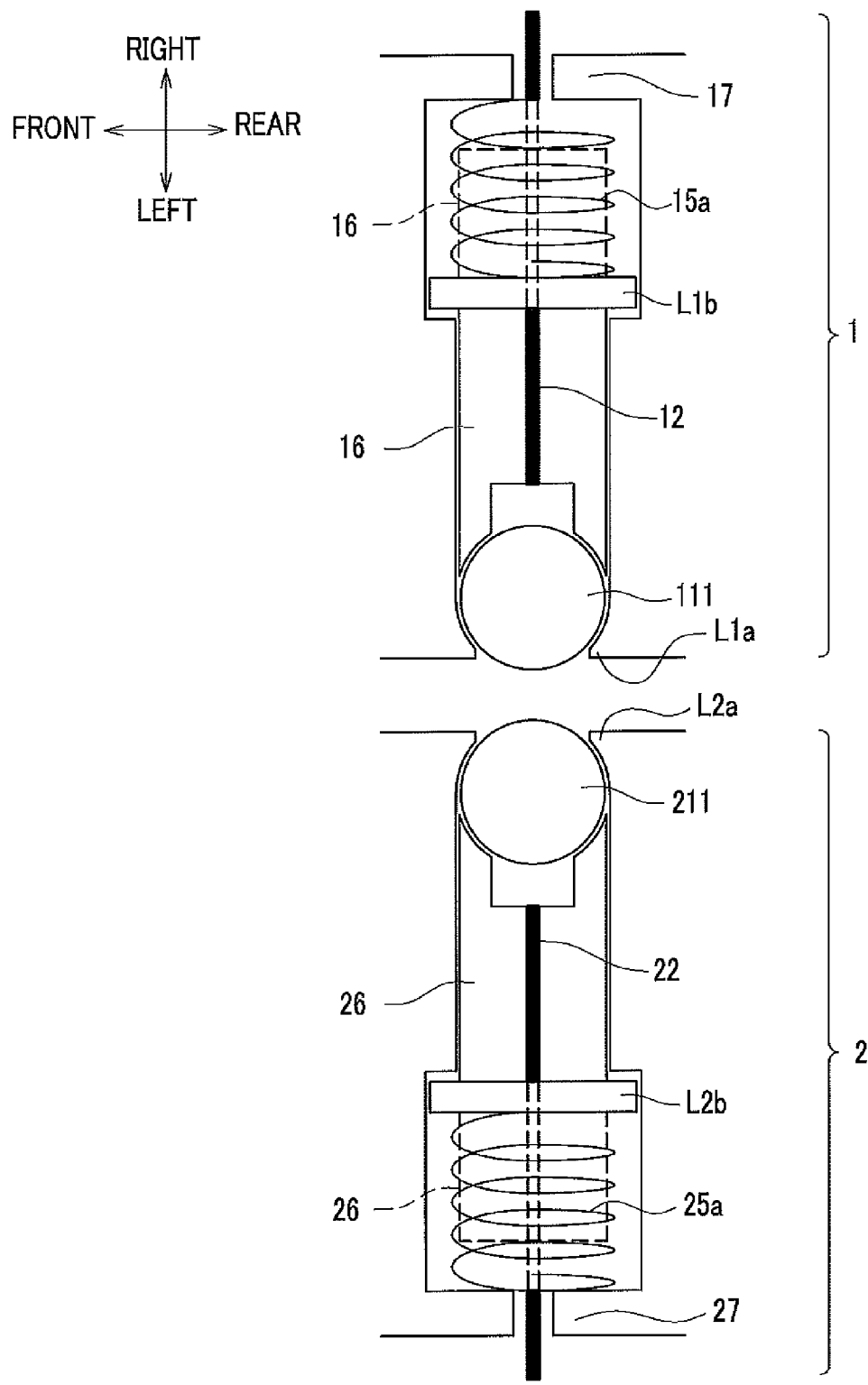
FIG. 10 is a schematic view showing details of still another example of the optical coupling part.

FIG. 10 shows another configuration example of the optical coupling part shown in FIG. 9. The optical coupling part of the plug 1 is provided with the ball lens 111 and a spring 15a. The optical coupling part of the jack 2 is provided with the ball lens 211 and a spring 25a.

Unlike the spring 15 shown in FIG. 9, the spring 15a shown in FIG. 10 resiliently supports the ferrule 16 to the left direction, with a greater space (than the thickness of the seat member 14) from the ball lens 111. More specifically, the spring 15a is disposed between a stopper L1b that functions as a flange integrated with the ferrule 16, and a stopper 17 that functions as a flange which is obtained by shaping the body of the plug 1, to resiliently support the ferrule 16. A diameter of the spring 15a is greater than a diameter of the ferrule 16 and an end portion (indicated by a dashed line) of the ferrule 16 is inserted inside the spring 15a.

Another end portion of the ferrule 16 supports the ball lens 111 to the left direction. The other end portion of the ferrule 16 has a curved surface which smoothens rolling of the ball lens 111, and a hole is formed in the center of the curved surface. The end portion of the optical fiber 12 exists in the innermost portion of the hole.

Formed on the side surface of the plug 1 is a stopper L1a that functions in the same way as the stopper L1 in FIG. 9. The stopper L1a has a curved surface which smoothens rolling of the ball lens 111.

Action of the spring 15a on the ball lens 111 is the same as action of the spring 15 in FIG. 9. Since the ferrule 16 is situated inside the spring 15a, contraction of the spring 15a enables the ferrule 16 to stably move in the right-left direction. When a pressure is externally applied to the ball lens 111, the stopper L1b is moved to the right direction (inward in the direction perpendicular to the front-rear direction: inward in the radial direction of the plug 1) to contract the spring 15a. When the ball lens 111 is released from the pressure, the stopper L1b, the ferrule 16 and the ball lens 111 are moved to the left direction by urging action of the spring 15a to allow a portion of the ball lens 111 to be exposed to the outside of the side surface of the plug 1.

According to the configuration of FIG. 10, the distance between the ball lens 111 and the end portion of the optical fiber 12 can be maintained at a predetermined distance independently of the contracted state of the spring 15a. As a result, light emitted from the ball lens 111 can be converted into a collimated light at all times and thus the optical transmission characteristics can be stabilized.

The form of the stopper L1a is not limited to the form shown in FIG. 10 and the stopper L1a can take an arbitrary form to keep its latching function.

Note that the spring 25a, a stopper L2b, a stopper 27 and the ferrule 26 of the jack 2 are similar to the spring 15a, the stopper L1b, the stopper 17 and the ferrule 16 of the plug 1, and the optical coupling part of the jack 2 functions in the same way as the optical coupling part of the plug 1. Moreover, a stopper L2a of the jack 2 functions in the same way as the stopper L1a of the plug 1. Accordingly, explanation about the jack 2 will be omitted.

Both of the plug 1 and the jack 2 do not necessarily include the same configuration as illustrated in FIG. 10. For example, the optical coupling part shown in FIG. 10 may be applied to only the jack 2, and the plug 1 may adopt the configuration of the optical coupling part shown in FIG. 4, FIG. 5, FIG. 6 and FIG. 7. Alternatively, the optical coupling part shown in FIG. 10 may be applied to only the plug 1, and the jack 2 may adopt the configuration of the optical coupling part shown in FIG. 4, FIG. 5, FIG. 6 and FIG. 7. These configurations produce advantages of downsizing and cost reduction.

(Regarding the Form of the Plug)

Figure 11:
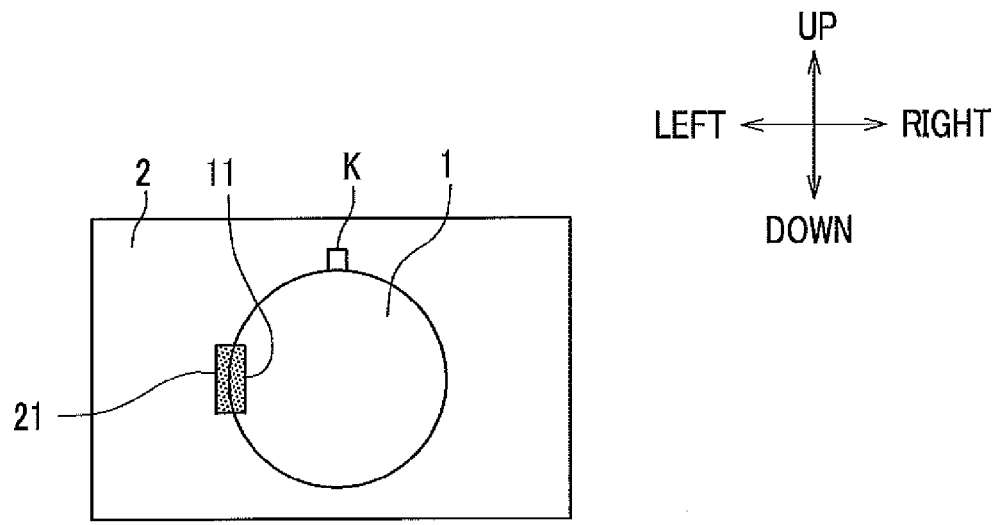
FIG. 11 is a schematic view when viewing an example of the plug and the jack at a time of engagement, from the rear.

As long as the position around the axis in the front-rear direction of the plug 1 can be uniquely determined, the present invention can be applied to any form of the plug 1. For example, as illustrated in FIG. 11, the lens 11 can be disposed on the side surface of the plug 1 having the form of circular column which has been described above, provided with the key K (see FIG. 1), and the lens 21 which faces the lens 11 at a time of engagement can be disposed on the inner side surface of the jack 2.

Figure 12:
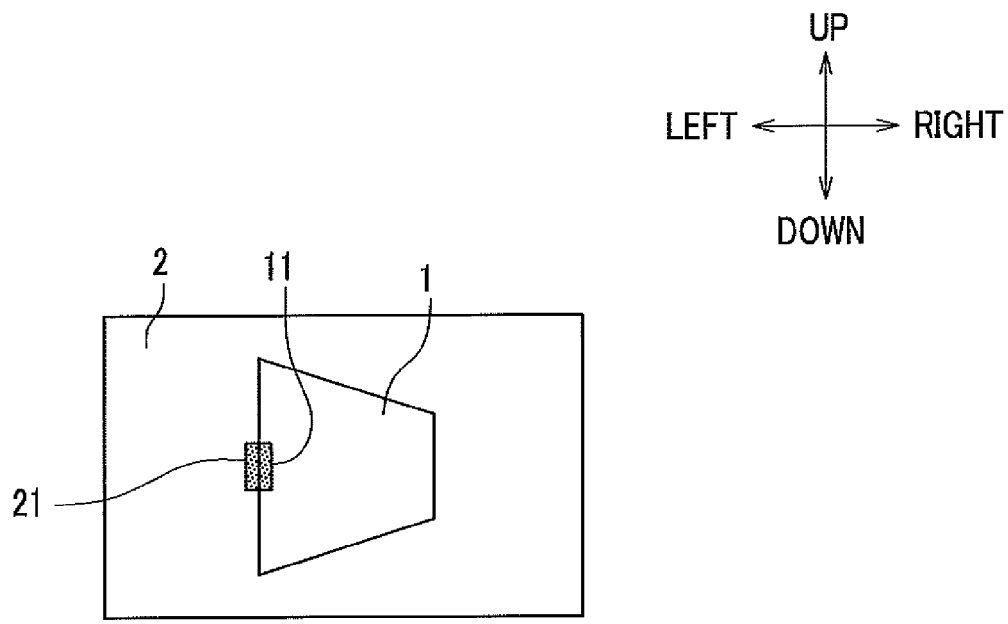
FIG. 12 is a schematic view when viewing another example of the plug and the jack at a time of engagement, from the rear.

Moreover, as illustrated in FIG. 12, the lens 11 can be disposed on one of side surfaces of the plug 1 having the form of quadrangular column which is trapezoidal in cross-section, and the lens 21 which faces the lens 11 at a time of engagement can be disposed on the inner side surface of the jack 2 which is engageable with the plug 1. The same also applies to a case where the form of the plug 1 is the form of a column which is not point-symmetric in cross-section. Where the form of the plug 1 is the form of a column which is not point-symmetric in cross-section, the position around the axis in the front-rear direction of the plug 1 can be uniquely determined without having to use a key mechanism comprised of the key K and the key groove H.

(Regarding Case where a Plurality of Optical Transmission Paths are Provided)

The present invention can also be applied to a case where the plug and the jack hold a plurality of optical fibers and a plurality of optical coupling parts, respectively. Referring to FIG. 13, the plug 1 and the jack 2 include two systems of optical transmission path each constituted by the optical fiber and the optical coupling part, respectively. For example, one optical transmission path (e.g., optical transmission path constituted by a lens 11a (11) and an optical fiber 12a (12) of the plug 1, and a lens 21a (21) and an optical fiber 22a (22) of the jack 2) can be used for transmission from the plug 1 to the jack 2, and another optical transmission path (e.g., optical transmission path constituted by a lens 11b (11) and an optical fiber 12b (12) of the plug 1, and a lens 21b (21) and an optical fiber 22b (22) of the jack 2) can be used for transmission from the jack 2 to the plug 1. Note that the plug 1 has the form of hexagonal column which is not point-symmetric in cross-section. Moreover, even if only one system of optical transmission path is introduced into the plug 1 and the jack 2, respectively (see FIG. 1), single core bidirectional optical transmission can be realized using a WDM (Wavelength Division Multiplexing) technique or the like.

Figure 14:
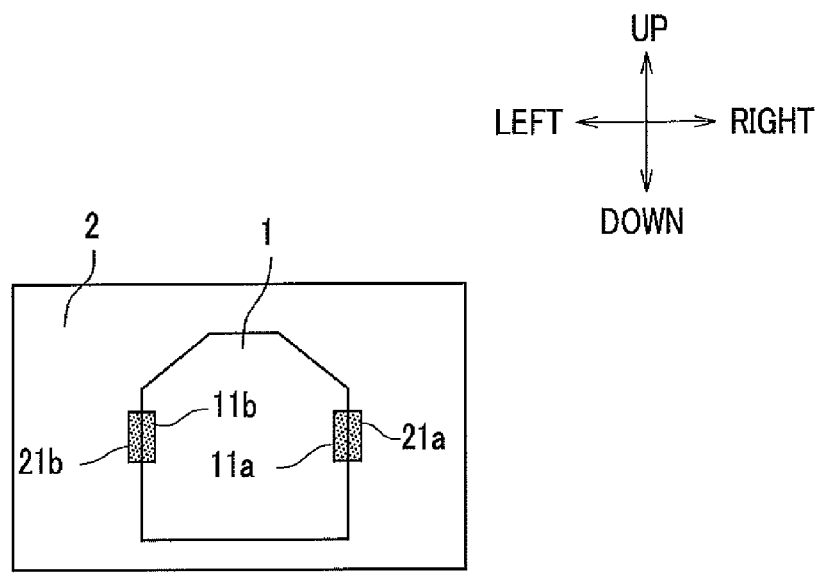
FIG. 14 is a schematic view when viewing the plug and the jack having the configuration shown in FIG. 13, from the rear.

As is apparent by reference to FIG. 14, the lens 11a is arranged on the right side surface of the plug 1, and the lens 11b is arranged on the left side surface of the plug 1. The lens 21a and the lens 21b are arranged at positions which face the lens 11a and the lens 11b, respectively. This arrangement enables two systems of optical transmission path to be realized even if the size in the up-down direction of the plug 1 is reduced, thereby making it possible to also reduce the size in the up-down direction of the jack 2 (lower profile) and to realize downsizing of the optical connector.

Moreover, FIG. 14 illustrates the form of hexagon obtained by cutting away two corners on the upside of the plug 1 having the form of quadrangular column, and the jack 2 conforms to the form of the plug 1. Applying the cutting-away to the plug 1 prevents a user from inserting the plug 1 into the jack 2 in a wrong direction such as upside down. As a result, facing of the lens 11a and the lens 21a and facing of the lens 11b and the lens 21b can be ensured.

Figure 15:
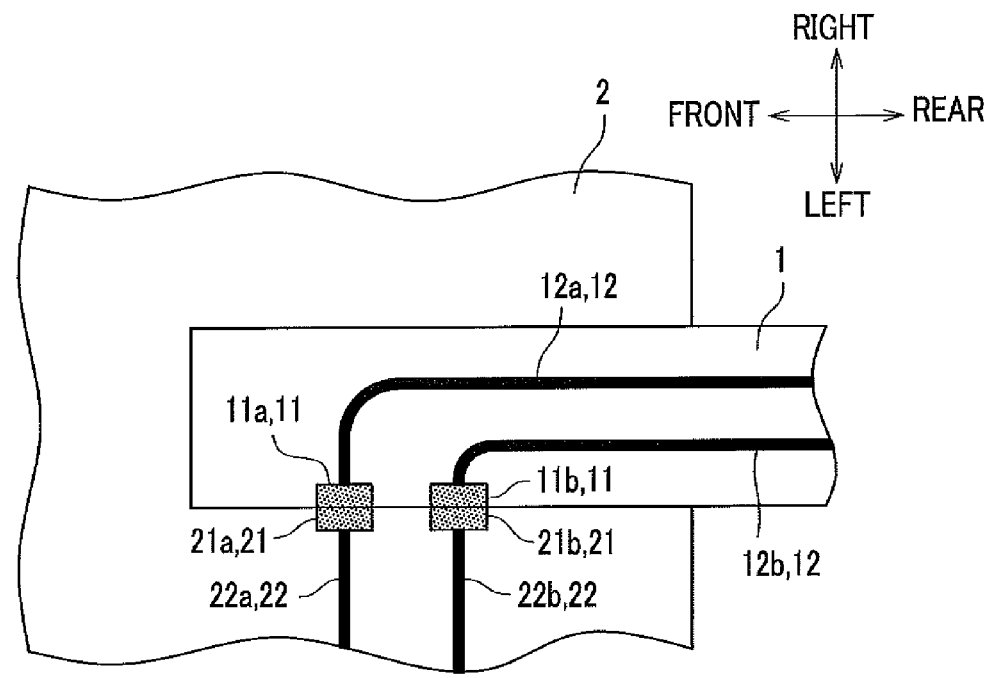
FIG. 15 is a schematic view when viewing another example from up above, in which the plug and the jack at a time of engagement hold a plurality of optical fibers and a plurality of optical coupling parts, respectively.

In contrast with the case of FIG. 13, as shown in FIG. 15, a configuration may be adopted such that two systems of optical transmission path are arranged on the left side surface of the plug 1. According to this configuration, an optical transmitter and receiver to be connected from the outside of the jack 2 need only be disposed on one side (e.g., the left side) of the jack 2 and need not be disposed on the opposite side (e.g., the right side) of the jack 2. As a result, an occupied area in the right-left direction of an optical transmitter and receiver (not shown) to be provided at the tips of the optical fiber 22a and the optical fiber 22b (on the left side) can be reduced nearly to half to achieve a reduction in implementation space.

Note that the configurations illustrated for the plug 1 with reference to FIGS. 13 to 15 can also be applied to the jack 2.

(Optical Path Conversion Part)

Description will be given of an optical path conversion part that converts an optical path of light transmitted from the optical fiber. Although in the description below, a configuration in which the plug 1 is provided with an optical path conversion part is described, a configuration in which the jack 2 is provided with an optical path conversion part can also be realized in the same way.

Figure 16:
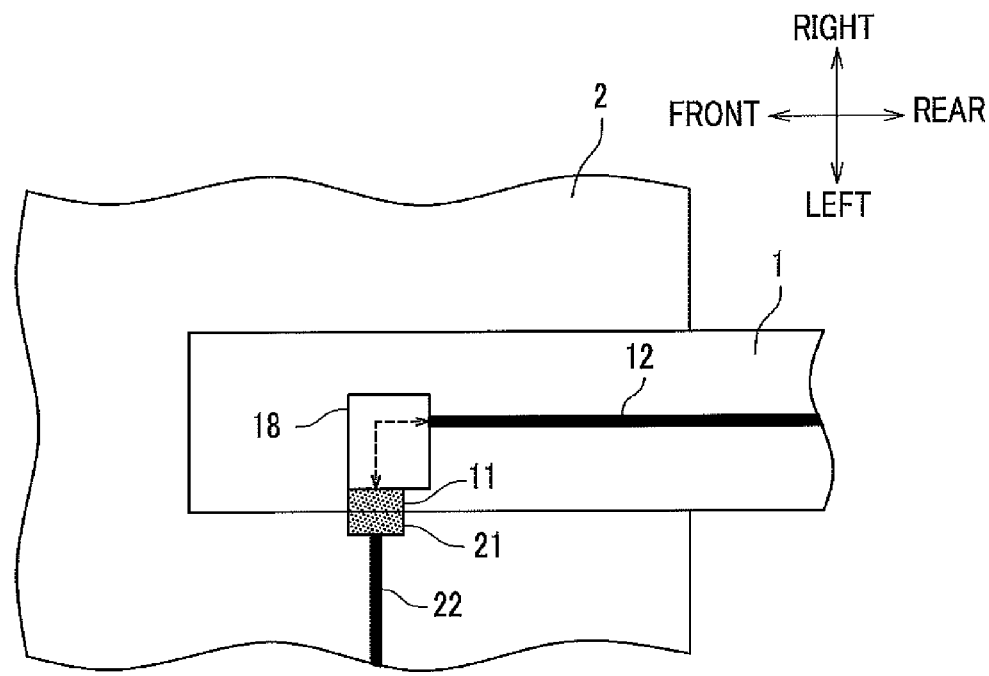
FIG. 16 is a schematic view for explaining an optical path conversion part, and corresponds to a view when viewing the plug and the jack at a time of engagement, from up above.

Referring to FIG. 16, disposed inside the plug 1 is an optical path conversion part 18 other than the lens 11 and the optical fiber 12. The optical path conversion part 18 is disposed between the end portion of the optical fiber 12 and the lens 11 and converts an optical path of light transmitted from the end portion of the optical fiber 12 to transmit the light to the lens 11, or converts an optical path of light transmitted from the lens 11 to transmit the light to the end portion of the optical fiber 12.

The optical fiber 12 is extended parallel to the front-rear direction and light transmitted forward from the end portion of the optical fiber 12 travels through the optical path conversion part 18 in the left direction to be transmitted to the lens 11. The lens 11 optically couples the transmitted light to the lens 21. Specific configurations of the optical path conversion part 18 will be described later.

Providing the optical path conversion part 18 makes it possible to perform optical path conversion without bending the optical fiber 12 as shown in FIG. 3 and to realize optical coupling between the lens 11 and the lens 21. It is generally difficult to reduce a curvature radius of an optical fiber without deteriorating optical transmission characteristics of the optical fiber. Accordingly, as compared to the configuration shown in FIG. 3, the configuration including the optical path conversion part 18 makes it possible to avoid deterioration in the optical transmission characteristics due to bending of the optical fiber, while keeping the advantage of considerably reducing a possibility that foreign materials exert influence on the transmission of light conducted in the optical connector.

Moreover, since the optical fiber 12 need not be bent, the entire plug 1 can be downsized. Since this also applies to the jack 2, the entire optical connector can be downsized.

Furthermore, when the angle at which the light enters the lens 11 is perpendicular to the lens 11, efficiency in the optical transmission is maximized. Also, designing such that the above angle is perpendicular to the lens 11 simplifies production of the optical connector. Accordingly, it is preferable that the optical path conversion part 18 is arranged so that the efficiency in the optical transmission is maximized. Note that when priority should be placed on suppression of reflected light at the optical coupling part, the above angle is not necessarily made perpendicular to the lens 11.

The optical path conversion part can take various forms. For example, as shown in FIG. 17, a mirror 18a and an optical fiber 18b can be used to configure the optical path conversion part 18.

The mirror 18a is disposed at an angle of 45 degrees to the left side relative to the front-rear direction. Accordingly, the mirror 18a reflects the light transmitted forward from the end portion of the optical fiber 12 extending in the front-rear direction to be transmitted in the left direction.

The optical fiber 18b is formed of, for example, the same material as that of the optical fiber 12, and is extended in the right-left direction. One end of the optical fiber 18b is connected to the lens 11. The light reflected at the mirror 18a is transmitted to another end of the optical fiber 18b. The light having been transmitted through the optical fiber 18b is optically coupled via the lens 11 to the lens 21.

Figure 17:
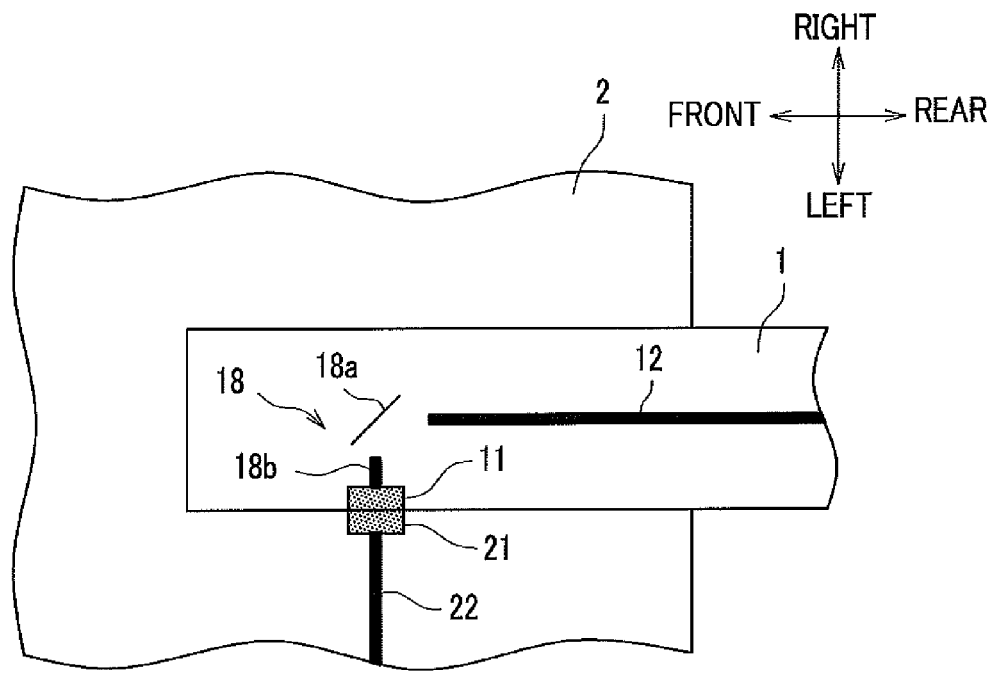
FIG. 17 is a schematic view showing details of an example of the optical path conversion part, and corresponds to a view when viewing the plug and the jack at a time of engagement, from up above.

According to the configuration shown in FIG. 17, there is no deterioration in the optical transmission characteristics due to a bend of the optical fiber because not only the optical fiber 12 but also the optical fiber 18b need not be bent. Note that even where a prism is used in place of the mirror 18a, the same effect can be achieved.

Figure 18:
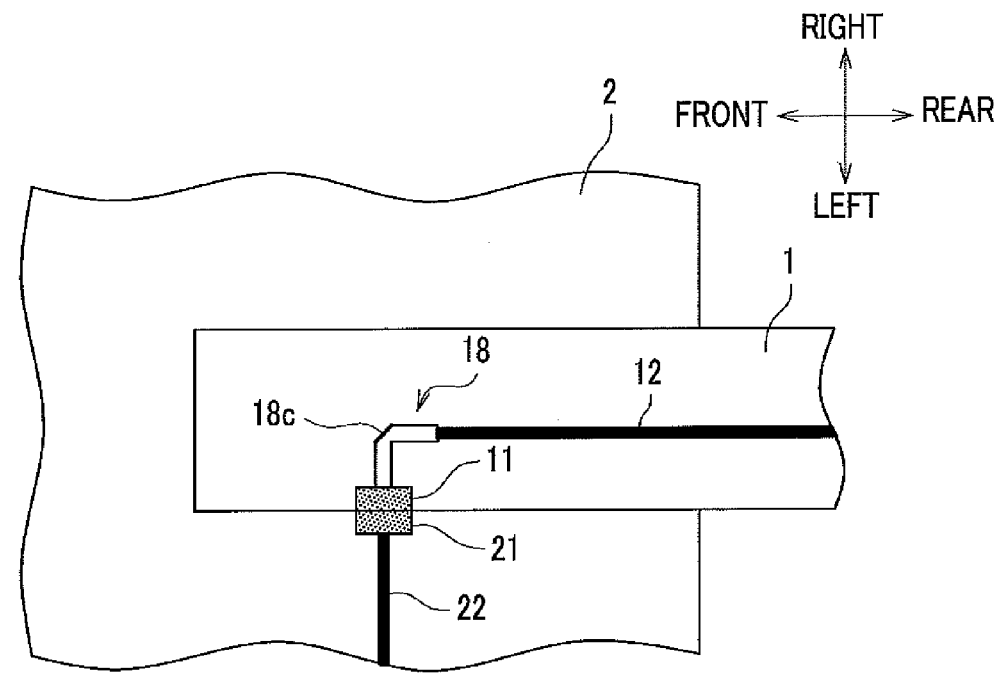
FIG. 18 is a schematic view showing details of another example of the optical path conversion part, and corresponds to a view when viewing the plug and the jack at a time of engagement, from up above.

Moreover, as shown in FIG. 18, even where an optical waveguide is adopted as the optical path conversion part 18, the same effect as the effect which can be achieved by the configuration shown in FIG. 17 can be achieved. The optical waveguide can be formed of plastic molding compound, for example, such as ULTEM [Registered Trademark]. Formed on the optical waveguide is an inclined surface 18c at an angle of 45 degrees to the left side relative to the front-rear direction. The inclined surface 18c is given mirror surface coating (indicated by a heavy line). Accordingly, the inclined surface 18c functions in the same way as the mirror 18a in FIG. 17.

According to the configuration shown in FIG. 18, accuracy in alignment of the optical axis can be improved and assembly cost of the plug 1 can be reduced, as compared to the configuration shown in FIG. 17. Note that from a standpoint of production of the optical connector, it is preferable that the optical path conversion part 18 in FIG. 18 is formed integral with the body of the plug 1 or with the lens 11.

Figure 19:
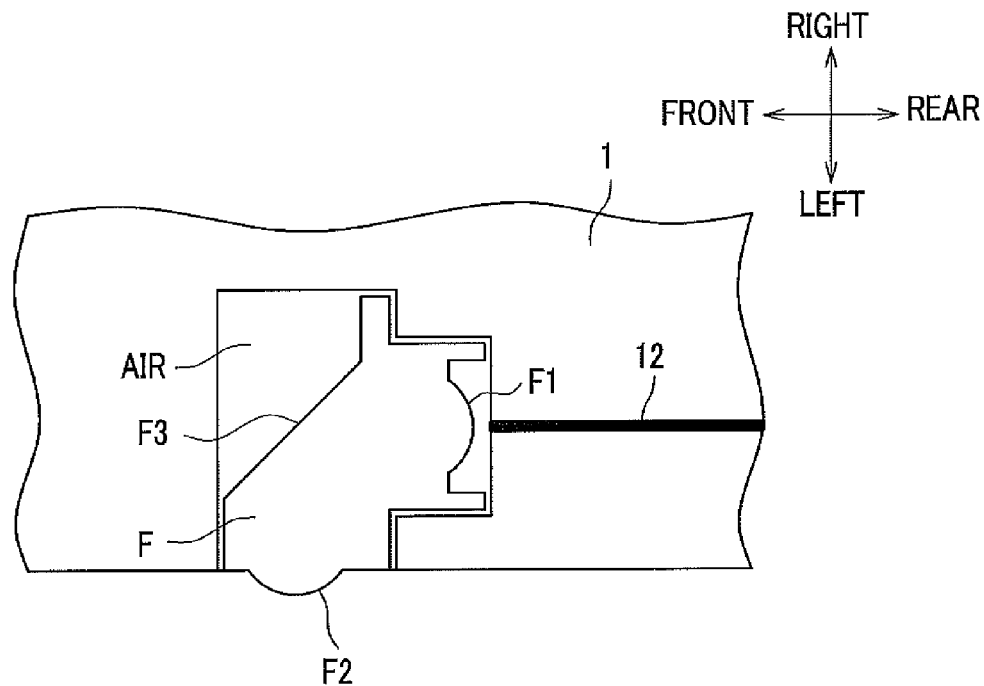
FIG. 19 is a schematic view showing details of still another example of the optical path conversion part, and corresponds to a view when viewing the plug at a time of engagement, from up above.

FIG. 19 illustrates an optical path conversion part that doubles as an optical coupling part, as a molded part F. The molded part F is made of plastic molding compound such as ULTEM. The molded part F is accommodated in a hole provided on the body of the plug 1. As is apparent by reference to FIG. 19, a portion of the surface of the molded part F abuts on a portion of the surface of the hole of the plug 1. Accordingly, the molded part F accommodated in the hole of the plug 1 cannot be rotated to ensure the positioning of the molded part F.

The molded part F includes a lens F1, a lens F2 and, an inclined surface F3. The lens F1 faces the end portion of the optical fiber 12 and collects light transmitted from the optical fiber 12. The lens F2 faces the optical coupling part (not shown) of the jack 2 to perform optical coupling. The inclined surface F3 is formed at an angle of 45 degrees to the left side relative to the front-rear direction. The light transmitted forward through the lens F1 is reflected at the inclined surface F3 in the left direction to reach the lens F2.

The molded part F made of ULTEM has a refractive index of approximately 1.6. Moreover, air exists in space between the molded part F and the above hole of the plug 1. Consequently, the reflection at the inclined surface F3 becomes a total reflection without any coating of a highly reflective material. Note that the inclined surface F3 may be given mirror surface coating. In this case, even if a molded part is formed of a material having a smaller refractive index, the function of optical path conversion at 90 degrees (total reflection) can be realized.

According to the configuration of FIG. 19, since the optical path conversion part doubles as the optical coupling part, the number of components required for production of the plug can be reduced to simplify the manufacturing process of the optical connector and to effect cost reduction.

(Shared Transmission of Optical Transmission and Electrical Transmission)

Figure 20:
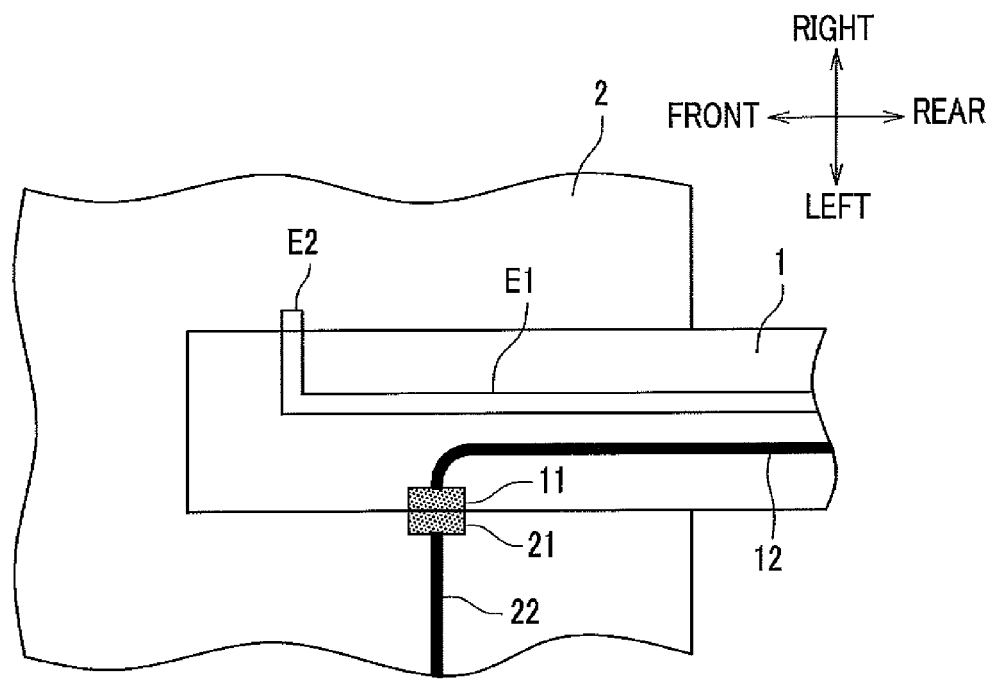
FIG. 20 is a schematic view showing an example in which the optical connector also performs transmission of an electric signal light, and corresponds to a view when viewing the plug and the jack at a time of engagement, from up above.

The present invention can also be applied to a case where the optical connector is provided with means for performing electrical transmission. For example, as illustrated in FIG. 20, the plug 1 includes an electric signal wiring E1 and the jack 2 includes an electric terminal E2. The electric signal wiring E1 and the electric terminal E2 are connected to each other at a time of engagement to enable the electrical transmission together with the optical transmission. Performing the electrical transmission makes it possible, for example, to secure a line for highly-efficient power supply which is difficult to be realized by the optical transmission. Although the electrical transmission is performed at the side surface of the plug 1 and the inner side surface of the jack 2 in FIG. 20, the electrical transmission may be performed at the tip of the plug 1.

Moreover, the forms of the plug 1 and the jack 2 can be designed to ensure the compatibility of connection with existing connectors such as USB (Universal Serial Bus). In this case, the optical connector according to the present invention can be used for the existing connectors or existing cables to improve convenience for a user.

(Wipers provided on Plug and Jack)

Figure 21:
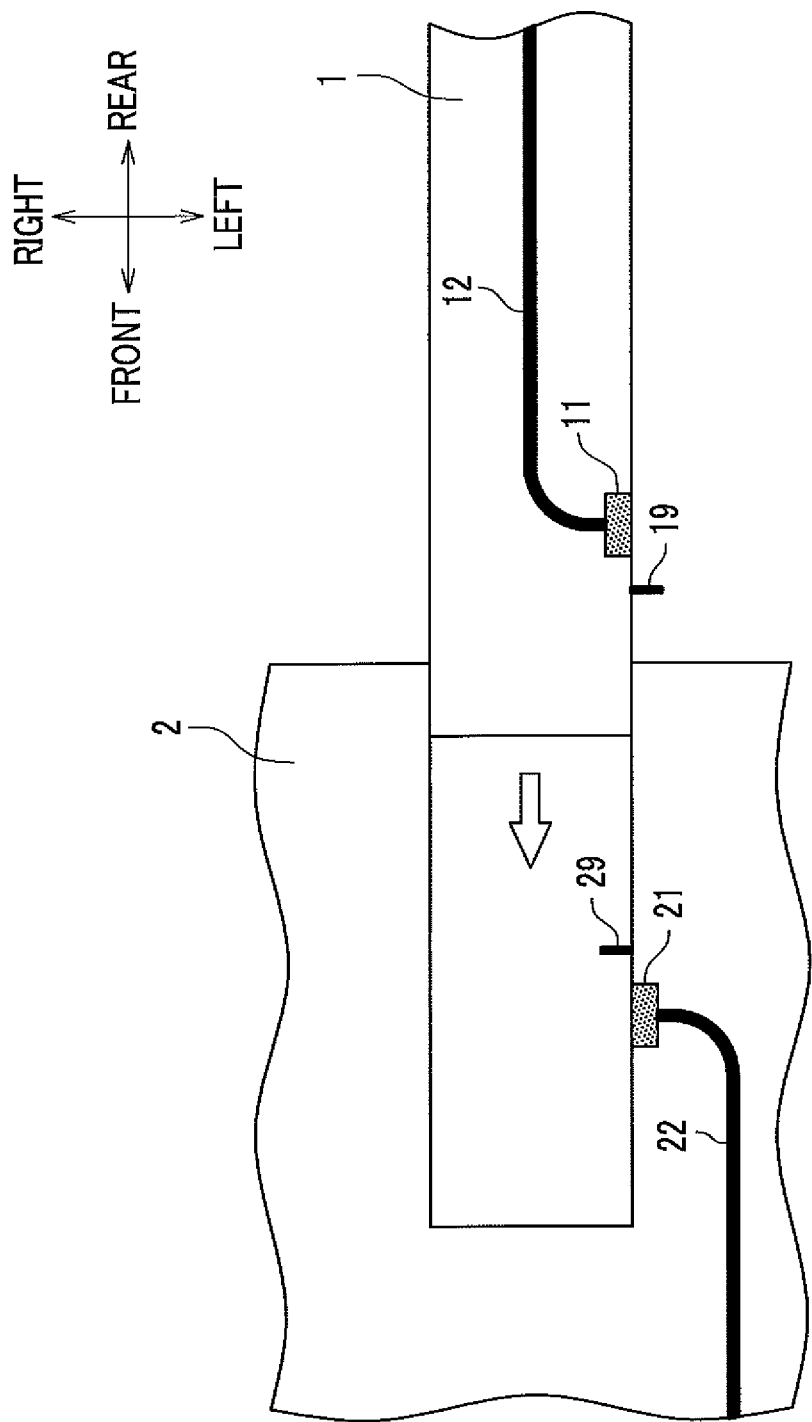
FIG. 21 is a schematic view showing details of an example of a wiper, and corresponds to a view when viewing the plug and the jack at a time of engagement, from up above.

With reference to FIG. 21, description will be given of a wiper 19 (plug-side wiper) provided on the plug 1 and a wiper 29 (jack-side wiper) provided on the jack 2.

The wiper 19 makes contact with the surface of the lens 21 when the plug 1 is inserted into or removed from the jack 2, and wipes the surface of the lens 21 during insertion/removal of the plug 1. The wiper 19 is disposed on the side surface of the plug 1 at the front of the lens 11. Note that as long as the wiper 19 makes contact with the lens 21 at a time of insertion/removal of the plug 1, the wiper 19 can be disposed at an arbitrary position with respect to the circumferential direction of the plug 1. Providing the wiper 19 produces an advantageous effect to certainly remove foreign materials from the lens 21 because the wiper 19 wipes the surface of the lens 21 at a time of insertion/removal of the plug 1. In particular, in the case where the lens 11 and the lens 21 are not rubbed with each other (see FIG. 4), a great advantageous effect is obtained.

The wiper 19 can be made from a material, for example, such as non-woven fabric, rubber or Teflon [Registered Trademark]. Use of such a material makes it possible to easily attach the wiper 19 to the side surface of the plug 1 and to improve durability of the entire optical connector because the wiper 19 wipes the surface of the lens 21 without scratching.

On the other hand, the wiper 29 makes contact with the surface of the lens 11 when the plug 1 is inserted into or removed from the jack 2, and wipes the surface of the lens 11 during insertion/removal of the plug 1. The wiper 29 is disposed on the inner side surface of the jack 2 at the rear of the lens 21. Note that as long as the wiper 29 makes contact with the lens 11 at a time of insertion/removal of the plug 1, the wiper 29 can be disposed at an arbitrary position with respect to the circumferential direction of the plug accommodation section C. Advantageous effects regarding the wiper 29 are the same as the wiper 19.

Note that the wiper is not necessarily provided on both of the plug 1 and the jack 2 and may be provided on either of the plug 1 or the jack 2.

Figure 22:
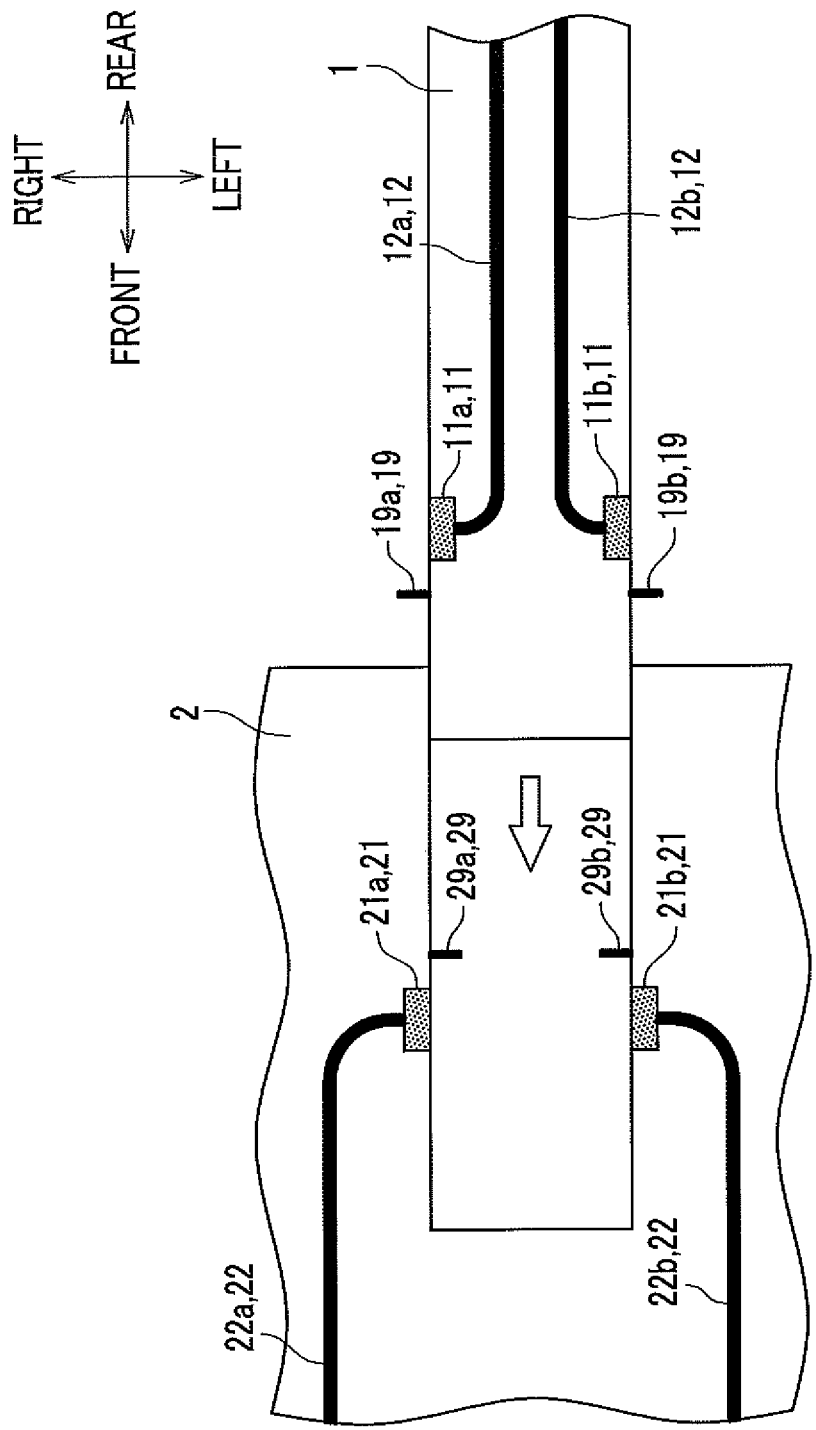
FIG. 22 is a schematic view showing details of another example of the wiper, and corresponds to a view when viewing the plug and the jack at a time of engagement, from up above.

Referring to FIG. 22, when the plug 1 and the jack 2 include a plurality of optical transmission paths (two systems in FIG. 22), respectively, they can be provided with wipers (19a (19), 19b (19), 29a (29), 29b (29)) corresponding to each lens (11a, 11b, 21a, 21b). The configuration shown in FIG. 22 is the same as the configuration in which four wipers are added to the configuration shown in FIG. 13.

Each of the wipers 19a, 19b, 29a and 29b makes contact with the surface of each of the lenses 21a, 21b, 11a and 11b when the plug 1 is inserted into or removed from the jack 2, and wipes the surface of the corresponding lens during insertion/removal of the plug 1. This configuration produces an advantageous effect to certainly remove foreign materials from all of the lenses.

Figure 23:
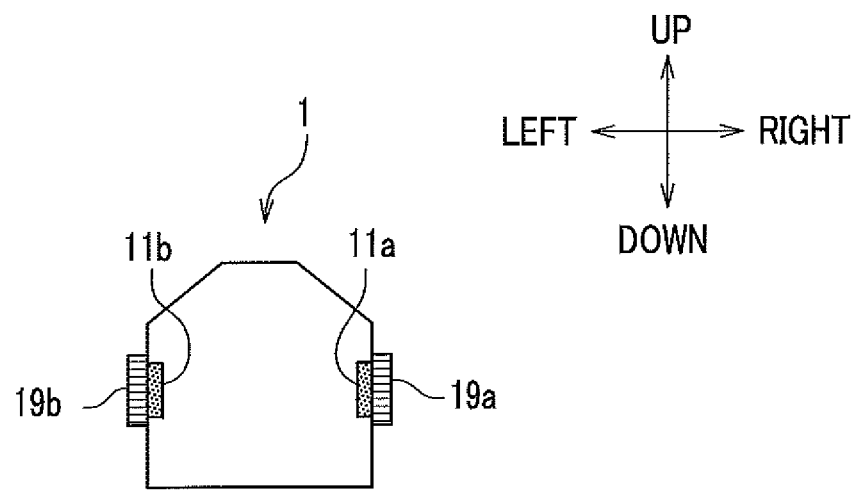
FIG. 23 is a schematic view when viewing an example of the plug having the wiper, from the rear.
Figure 24:
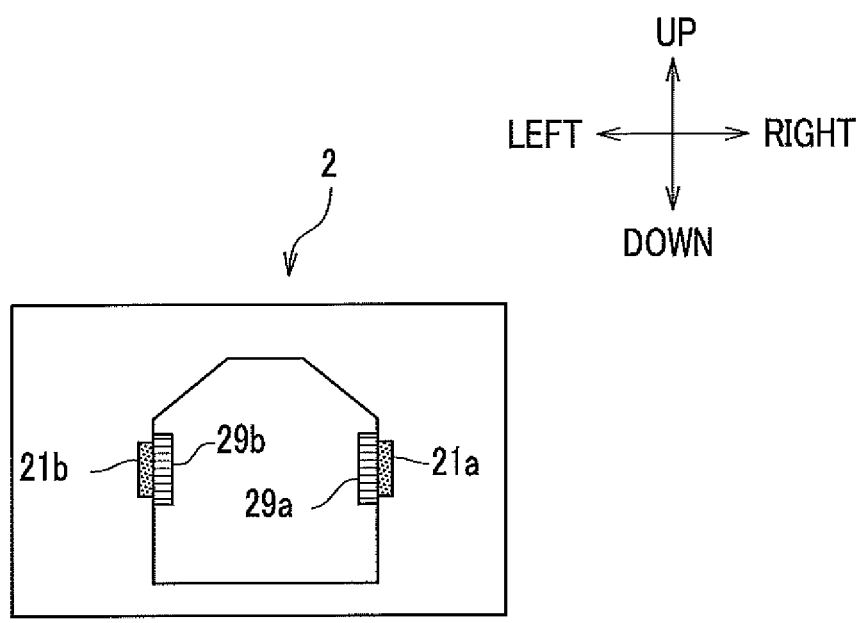
FIG. 24 is a schematic view when viewing an example of the jack having the wiper, from the rear.

The configuration of the plug 1 shown in FIG. 23 is the same as the configuration of the plug 1 shown in FIG. 22. The configuration of the jack 2 shown in FIG. 24 is the same as the configuration of the jack 2 shown in FIG. 22. Referring to FIG. 23 and FIG. 24, it can be understood that the width of each of the wipers 19a, 19b, 29a and 29b in the up-down direction is greater than the width of each of the lenses 11a, 11b, 21a and 21b in the up-down direction. Accordingly, the wipers 19a, 19b, 29a and 29b have an advantageous effect to wipe the entire surfaces of the corresponding lenses 21a, 21b, 11a and 11b. Note that for convenience of explanation, although it is assumed that the size of each of the wipers 19a, 19b, 29a and 29b is identical to each other and the size of each of the lenses 21a, 21b, 11a and 11b is identical to each other, the sizes of the lenses and the wipers may be different from each other as long as the above advantageous effect is produced.

Figure 25:
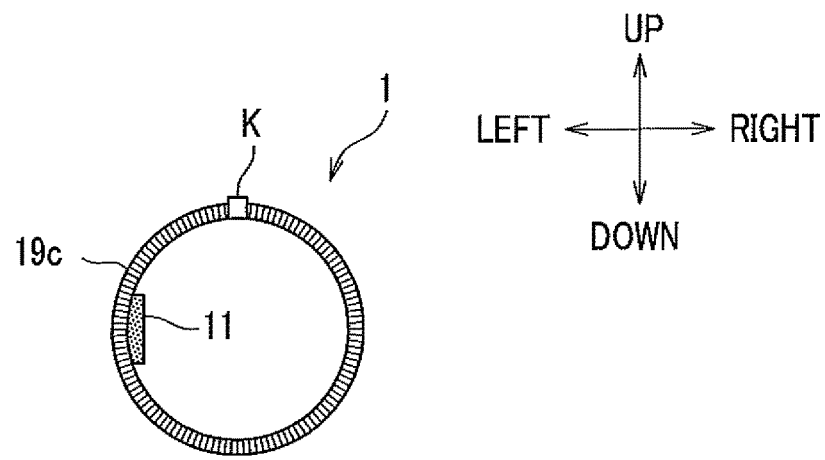
FIG. 25 is a schematic view when viewing another example of the plug having the wiper, from the rear.
Figure 26:
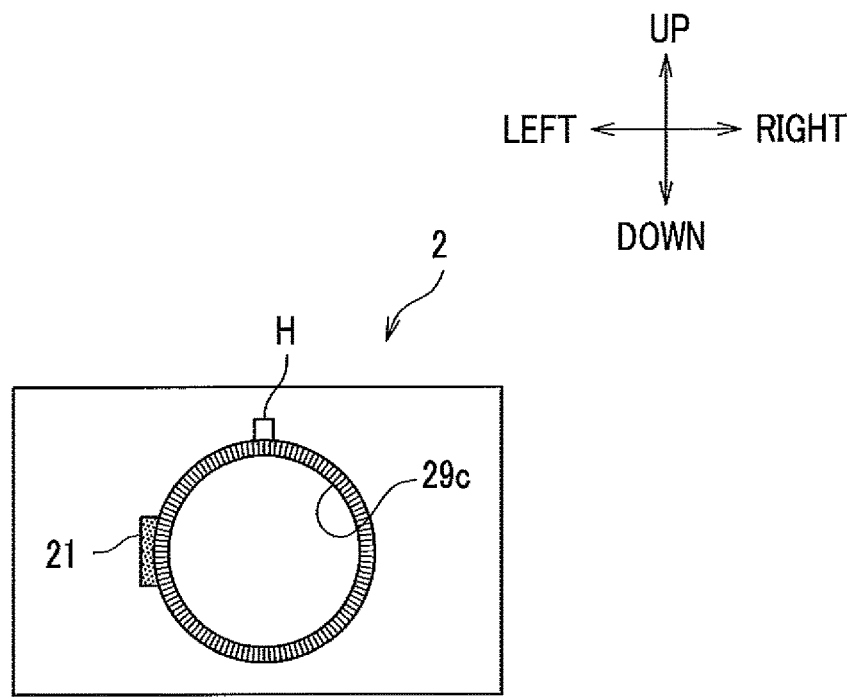
FIG. 26 is a schematic view when viewing another example of the jack having the wiper, from the rear.

As shown in FIG. 25 and FIG. 26, the wipers can also be used in the plug 1 having the form of circular column and the jack 2 into which the plug 1 is fitted (see FIG. 1). Referring to FIG. 25, the plug 1 having the form of circular column is provided with a wiper 19c that is disposed at the front of the lens 11 so as to be able to wipe the lens 21 and extends by a predetermined distance outward in the radial direction over the circumferential direction. Also, referring to FIG. 26, the jack 2 into which the plug 1 having the form of circular column is fitted is provided with a wiper 29c that is disposed at the rear of the lens 21 so as to be able to wipe the lens 11 and extends by a predetermined distance inward in the radial direction over the circumferential direction. This configuration produces an advantageous effect to certainly remove foreign materials from the entire plug 1, not only the lenses 11 and 21.

(Shutters Provided on Plug and Jack)

With reference to FIGS. 27A to 30, description will be given of embodiments in which a shutter 31 or a shutter 41 is disposed on the plug 1 or the jack 2. Note that in the embodiments, the plug 1 has the form of circular column and the plug accommodation section C of the jack 2 conforms to the form of the plug 1.

Figure 27A:
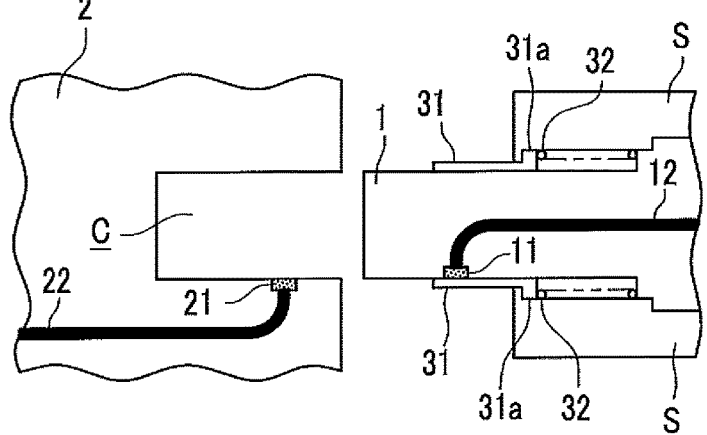
FIGS. 27A to 27C are schematic views showing details of an example of a shutter provided in the plug, in which FIG. 27A corresponds to a view when viewing the plug and the jack at a time of non-insertion, from up above.
Figure 27B:
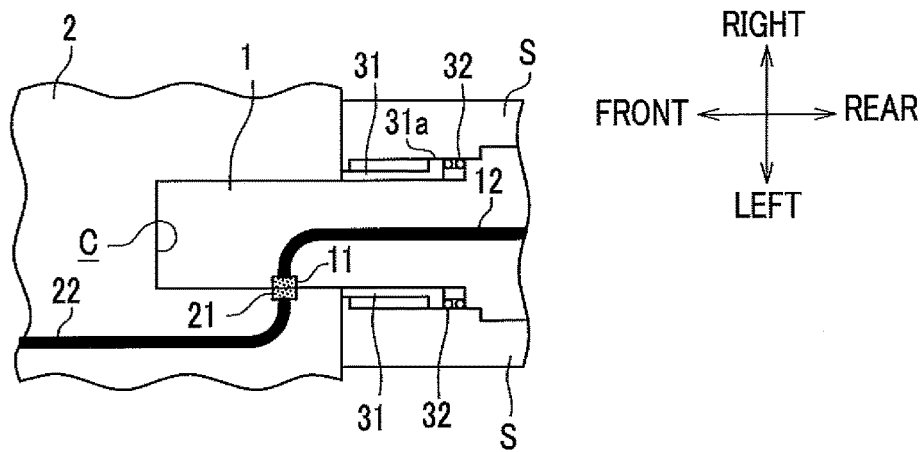
Figure 27C:
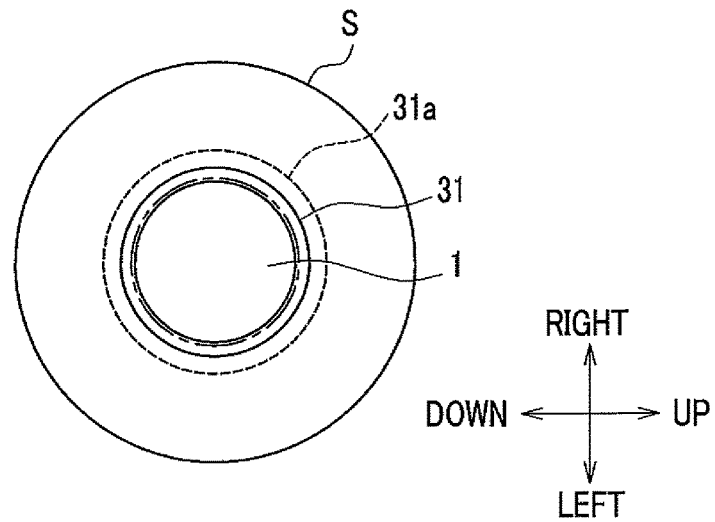

In the embodiment shown in FIGS. 27A to 27C, the plug 1 includes the shutter 31 (plug-side shutter) and a spring 32 (plug-side urging part). The shutter 31 has the form of circular cylinder into which the plug 1 is inserted and which slides on the side surface of the plug 1. The shutter 31 is provided with a flange portion 31a at the rear end thereof, which extends outward in the radial direction over the circumferential direction. The axial length of the shutter 31 is a length such that an inner side surface of the shutter 31 can cover the lens 11 at a time of non-insertion of the plug 1 (see FIG. 27A).

As shown in FIG. 27C, an inside diameter of the shutter 31 is nearly equal to a diameter of the head part of the plug 1 from a standpoint of prevention of entry of foreign materials such as dust or mote. Also, an outside diameter of the shutter 31 is greater than an opening size (indicated by a chain line in FIG. 27C) of the jack 2, namely, a diameter of the entrance of the plug accommodation section C.

The spring 32 is means for urging the shutter 31 which has been moved to the rear direction relative to the plug 1, to the front direction. The plug 1 is inserted into the spring 32 which is disposed on the inside of the support part S having the form of nearly circular cylinder. A front end portion of the spring 32 abuts at all times on the flange portion 31a of the shutter 31. A rear end portion of the spring 32 abuts at all times on a step-like portion of the plug 1 which extends outward in the radial direction on the inside of the support part S. Accordingly, the spring 32 urges the shutter 31 to the front direction at all times.

At a time of non-insertion of the plug 1, the shutter 31 is forced forward by urging action of the spring 32. However, the flange portion 31a of the shutter 31 is latched together by a flange portion which extends inward in the radial direction at the front end of the support part S. As a result, the shutter 31 is established at a predetermined position and thus is prevented from popping out of the plug 1.

As shown in FIG. 27A, at a time of non-insertion of the plug 1, the shutter 31 covers the lens 11 (shutter-closed state). As a result, at a time of non-insertion of the plug 1, the shutter 31 makes it possible to suppress entry of foreign materials to the neighborhood of the lens 11 and to prevent the user from directly touching the lens 11 with hands, to thereby certainly protect the lens 11.

When the plug 1 is partway inserted into the jack 2, the front end of the shutter 31 abuts on a periphery of the entrance of the plug accommodation section C, of the rear surface of the jack 2. When the plug 1 is further inserted, the shutter 31 contracts the spring 32 and slides to the rear direction (removal direction of the plug 1) relative to the plug 1. As a result, the shutter 31 moves away from the position of the lens 11 (shutter-open state) to expose the lens 11 from the shutter 31.

As shown in FIG. 27B, at a time of engagement of the plug 1 with the jack 2, the shutter 31 slides to the rear direction innermost within its movable range relative to the plug 1 to be accommodated in the support part S, thereby allowing the lens 11 to face the lens 21. Moreover, when the plug 1 is removed from the jack 2, the spring 32 expands to allow the shutter 31 to slide to the front direction relative to the plug 1 to cover the lens 11.

As has been already described, the optical connector 100 of the present embodiment adopts the configuration in which the lens 11 is disposed on the side surface of the plug 1 and the lens 21 is disposed on the inner side surface of the jack 2. Consequently, the insertion/removal direction of the plug 1 can be made the same as the sliding direction of the shutter 31. Accordingly, a remarkable feature which is not found in the prior art can be realized in that the shutter 31 is allowed to slide in the insertion/removal direction of the plug 1 in conjunction with a usual operation by the user which is insertion/removal of the plug 1, thereby opening and closing the shutter 31 for the lens 11. Only the usual operation by the user which is insertion/removal of the plug 1 can satisfy both of that the shutter 31 is closed to protect the lens 11 at a time of non-insertion, and that the shutter 31 is opened to allow the lenses 11 and 21 to perform optical coupling to each other at a time of engagement. As a result, a possibility can be considerably reduced that foreign materials exert influence on the transmission of light conducted in the optical connector.

An optical connector in the prior art has adopted the configuration in which the optical coupling is performed between the tip of the plug and the innermost portion of the plug accommodation section of the jack. Consequently, where a shutter is installed, the shutter has to be configured to slide in a direction perpendicular to an insertion/removal direction of the plug. As a result, a mechanism for achieving opening/closing of the shutter inevitably becomes complicated to cause an increase in cost and a decrease in reliability. The optical connector 100 of the present embodiment adopts the configuration in which the optical coupling is performed between the side surface of the plug 1 and the inner side surface of the jack 2. Consequently, with an extremely simple structure having the smaller number of required parts as described above, opening/closing operation of the shutter 31 can be realized in conjunction with the usual operation by the user which is insertion/removal of the plug 1.

Figure 28B:
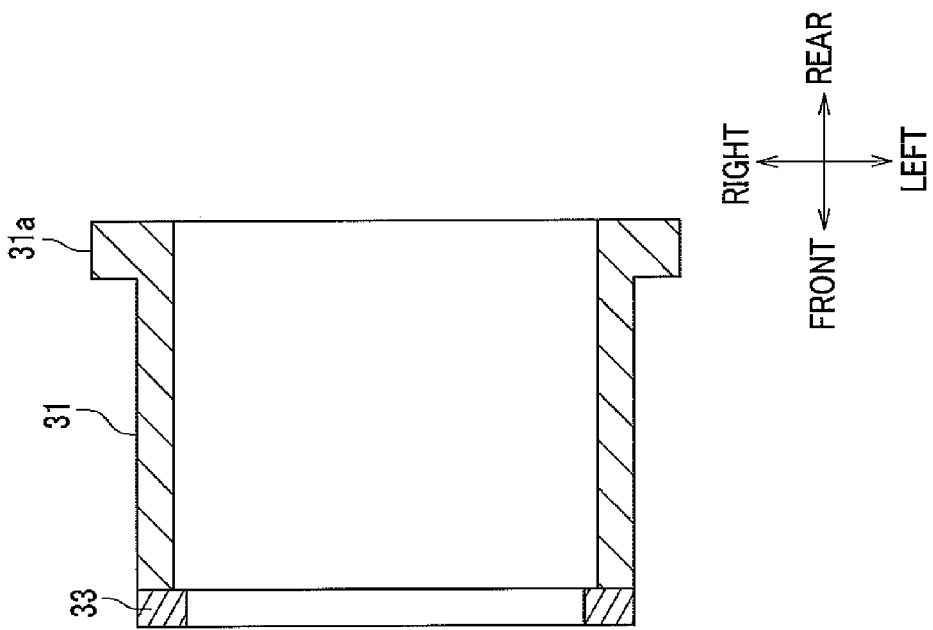
Figure 28A:
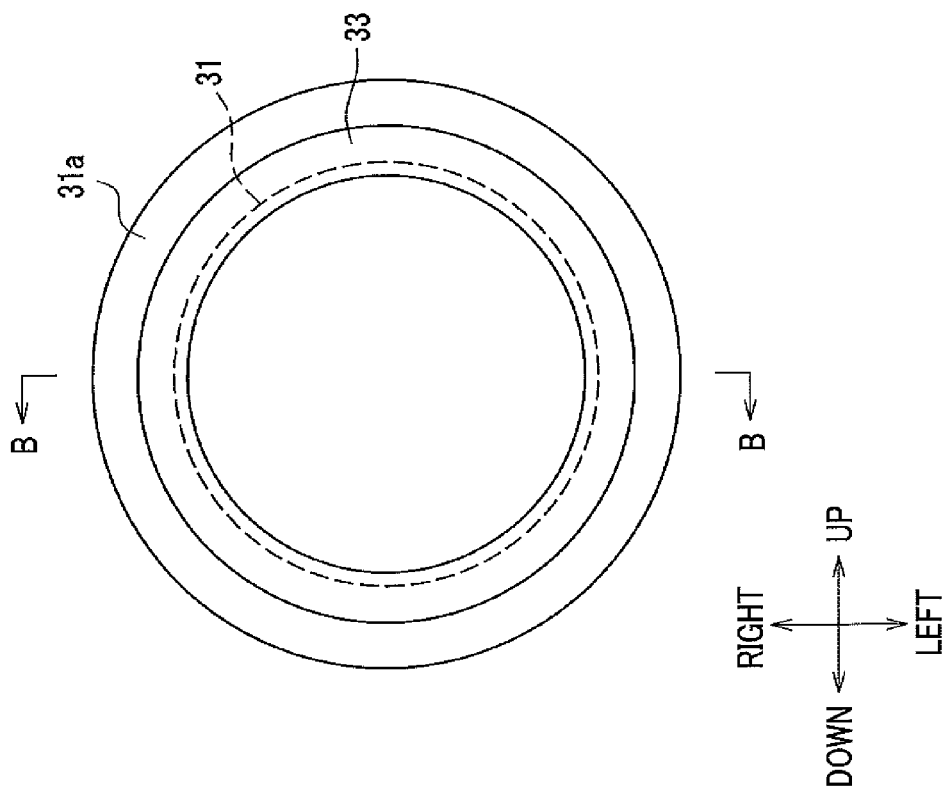

As shown in FIGS. 28A and 28B, as another example of the embodiment relating to the shutter 31, the shutter 31 is provided with a wiper 33 (plug-side wiper for shutter) that wipes in contact with the surface of the lens 11 during insertion/removal of the plug 1. The wiper 33 has the form of a ring the center of which coincides with that of the shutter 31 having the form of circular cylinder, and can be made from, for example, non-woven fabric. The wiper 33 is attached to the front end of the shutter 31, for example, using an adhesive. An inside diameter of the wiper 33 is slightly smaller than the inside diameter of the shutter 31.

When the plug 1 is inserted into the jack 2, the shutter 31 slides to the rear direction relative to the plug 1. In doing so, since the wiper 33 is wound along the side surface of the plug 1, it can wipe the lens 11 which is to be exposed from the shutter 31, without hindering the insertion of the plug 1. Moreover, when the plug 1 is removed from the jack 2, the spring 32 allows the shutter 31 to slide to the front direction relative to the plug 1. In doing so, since the wiper 33 is wound along the side surface of the plug 1, it can wipe the lens 11 which is to be covered by the shutter 31, without hindering the removal of the plug 1.

Accordingly, since the wiper 33 wipes the surface of the lens 11 by the opening/closing operation of the shutter 31 in conjunction with the usual operation by the user which is insertion/removal of the plug 1, foreign materials can be certainly removed from the lens 11.

Moreover, the wiper 33 shown in FIGS. 28A and 28B wipes not only the lens 11 but also the entire side surface of the head part of the plug 1 by the insertion/removal of the plug 1 because the wiper 33 is attached to the front end of the shutter 31 over the circumferential direction. As a result, foreign materials can be certainly removed from the lens 11, without having to provide an angle fixing mechanism that fixes a position around the axis in the insertion/removal direction of the plug 1 relative to the jack 2, for example, a key mechanism comprised of a key provided on the plug 1 and a key groove provided on the jack 2.

Note that as long as the angle fixing mechanism such as the key mechanism is provided, the form of the wiper 33 may be modified to wipe only a partial region containing the surface of the lens 11 on the side surface of the plug 1.

Note that the form of the plug 1 is not limited to the form of circular column and may be the form of elliptical column, the form of quadrangular column, the form of trapezoidal column, or other forms. It is only necessary for the form of the plug accommodation section C of the jack 2 to conform to the form of the plug 1.

Figure 29A:
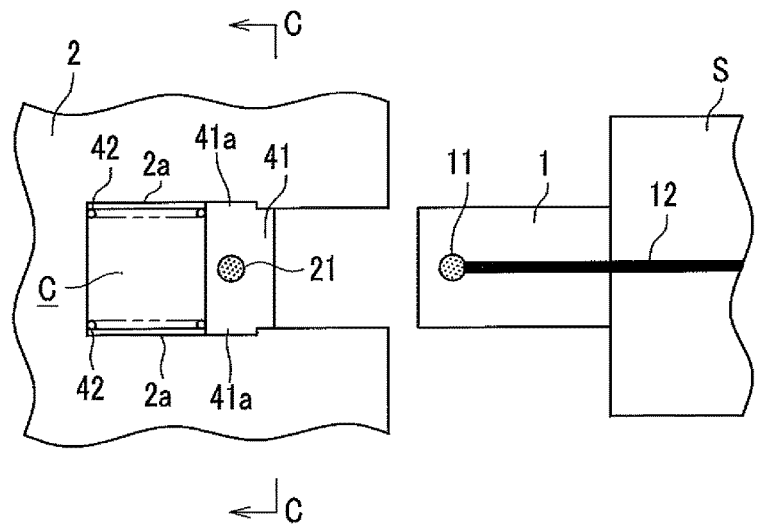
FIG. 29A is a schematic view showing details of an example of a shutter provided in the jack, and corresponds to a view when viewing the plug and the jack at a time of non-insertion, from the left.
Figure 29B:
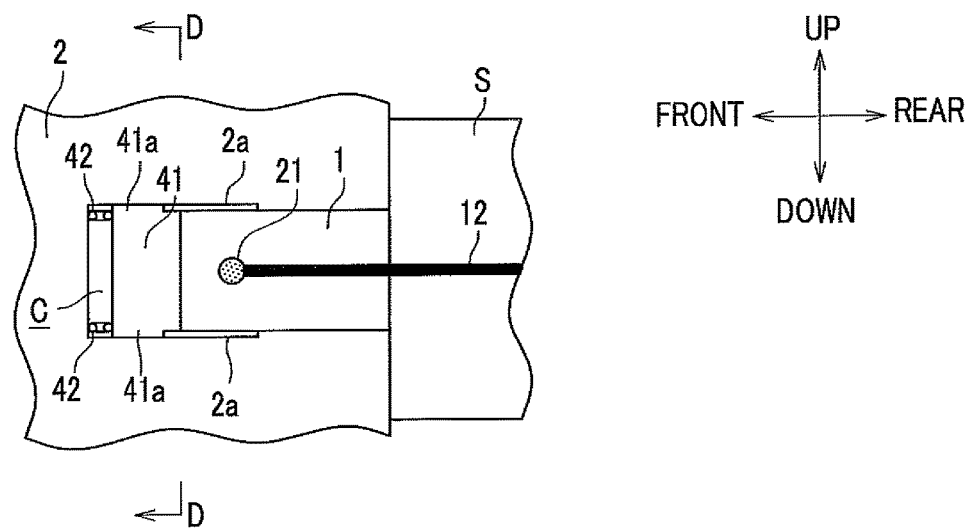
FIG. 29B is a schematic view showing details of the example of the shutter provided in the jack, and corresponds to a view when viewing the plug and the jack at a time of engagement, from the left.
Figure 29C:
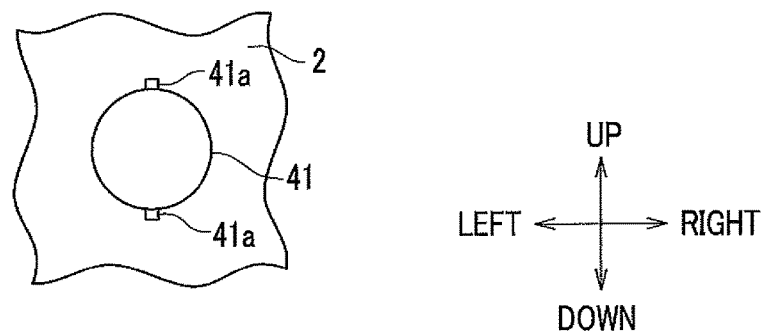
FIG. 29C is a schematic view showing details of the example of the shutter provided in the jack, which is a cross-sectional view taken along the line D-D in FIG. 29B.
Figure 29D:
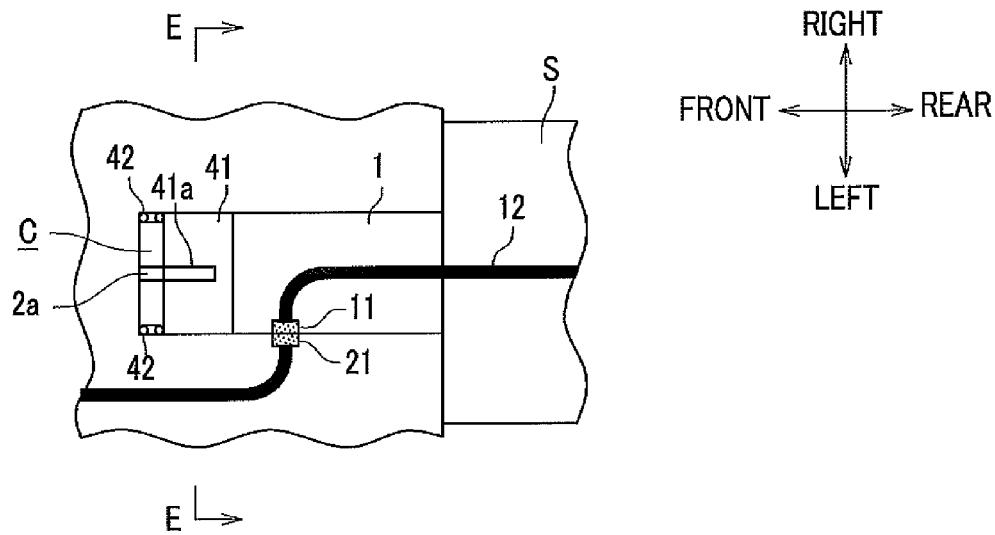
FIG. 29D is a schematic view showing details of the example of the shutter provided in the jack, and corresponds to a view when viewing the plug and the jack at a time of engagement, from up above.
Figure 29E:
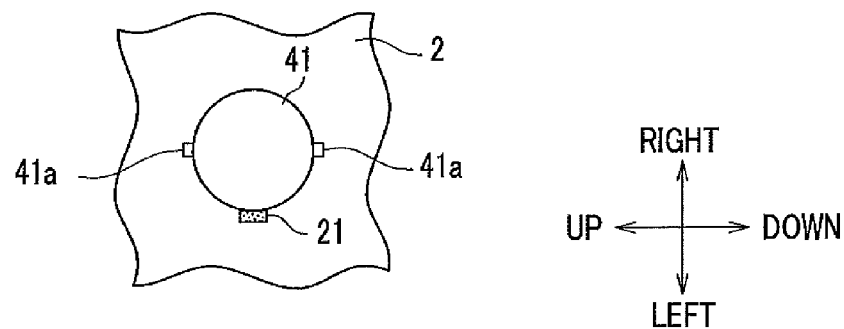
FIG. 29E is a schematic view showing details of the example of the shutter provided in the jack, which is a cross-sectional view taken along the line E-E in FIG. 29D.
Figure 29F:
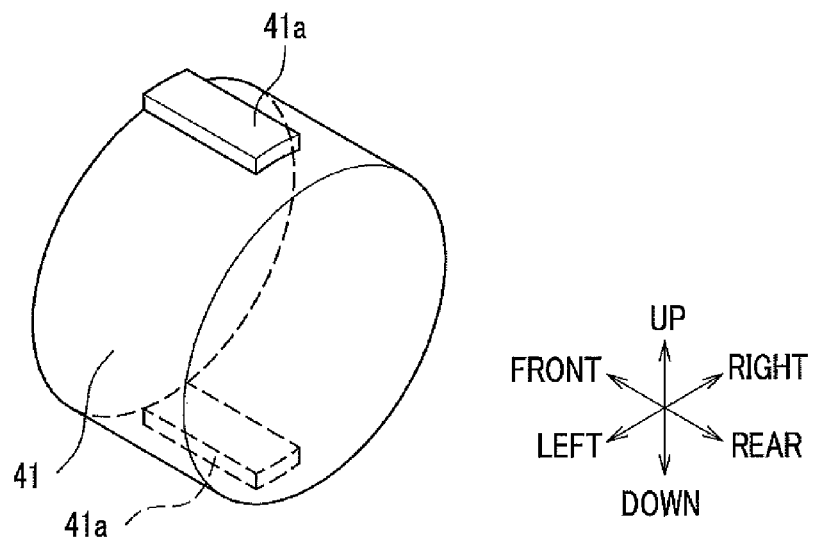
FIG. 29F is a schematic view showing details of the example of the shutter provided in the jack, which is a perspective view of the shutter provided in the jack.

In the embodiment shown in FIGS. 29A to 29F, the jack 2 includes the shutter 41 (jack-side shutter) and a spring 42 (jack-side urging part). As shown in FIG. 29F, the shutter 41 has the form of nearly circular column which slides on the inner side surface of the jack 2. The shutter 41 is provided with a projecting portion 41a at the upper end and the lower end on the side surface thereof, which extends upward and downward, respectively, over a portion of the side surface with respect to the axial direction. Preferably, the projecting portion 41a is formed at positions where it does not face the lens 21 (in FIGS. 29A to 29C, the projecting portion 41a is provided at an angular difference of 90 degrees from the lens 21 in the circumferential direction). The axial length of the shutter 41 is a length such that the side surface of the shutter 41 can cover the lens 21 at a time of non-insertion of the plug 1 (see FIG. 29A). Note that it is preferable that the axial length of the shutter 41 is the minimum length necessary to cover the lens 21.

A diameter of the shutter 41 is nearly equal to a hole diameter of the plug accommodation section C of the jack 2 from a standpoint of prevention of entry of foreign materials such as dust or mote.

Formed on the inner side surface of the jack 2 is a concave recessed portion 2a that is engaged with the projecting portion 41a of the shutter 41 with respect to the circumferential direction. Since the recessed portion 2a is formed by a predetermined length with respect to the axial direction, the projecting portion 41a is movable in the axial direction with being fitted inside the recessed portion 2a, thereby allowing the shutter 41 to axially slide on the inner side surface of the jack 2.

The spring 42 is means for urging the shutter 41 which has been moved to the front direction relative to the jack 2, to the rear direction, and is disposed in the plug accommodation section C of the jack 2. A front end portion of the spring 42 abuts at all times on the innermost portion of the plug accommodation section C of the jack 2. A rear end portion of the spring 42 abuts at all times on the front end portion of the shutter 41. Accordingly, the spring 42 urges the shutter 41 to the rear direction at all times.

At a time of non-insertion of the plug 1, the shutter 41 is forced rearward by urging action of the spring 42. However, the projecting portion 41a of the shutter 41 is latched together by a rear end portion of the recessed portion 2a of the jack 2. As a result, the shutter 41 is established at a predetermined position and thus is prevented from being removed from the jack 2. Moreover, as shown in FIG. 29E, the recessed portion 2a (the projecting portion 41a of the shutter 41) is disposed at the position with an angular difference of 90 degrees from the lens 21 in the circumferential direction. The arrangement described above can satisfy both of removal preventive function of the shutter 41 and proximity of the lens 11 to the lens 21 (facing of the opposed faces at an optimum distance) at a time of engagement and thus increase efficiency in the optical coupling in the optical connector.

As shown in FIG. 29A, at a time of non-insertion of the plug 1, the shutter 41 covers the lens 21 (shutter-closed state). As a result, at a time of non-insertion of the plug 1, the shutter 41 makes it possible to suppress entry of foreign materials to the neighborhood of the lens 21 to certainly protect the lens 21.

When the plug 1 is partway inserted into the jack 2, the tip of the plug 1 abuts on the rear end portion of the shutter 41. When the plug 1 is further inserted, the shutter 41 contracts the spring 42 and slides to the front direction (direction of the innermost portion of the jack 2). As a result, the shutter 41 moves away from the position of the lens 21 (shutter-open state) to expose the lens 21 from the shutter 41.

As shown in FIG. 29B, at a time of engagement of the plug 1 with the jack 2, the shutter 41 slides to a slightly rear position of the innermost portion of the plug accommodation section C relative to the jack 2, thereby allowing the lens 21 to face the lens 11. Moreover, when the plug 1 is removed from the jack 2, the spring 42 expands to allow the shutter 41 to slide to the rear direction relative to the jack 2 to cover the lens 21.

As described above, the optical connector 100 of the present embodiment makes it possible to make the insertion/removal direction of the plug 1 the same as the sliding direction of the shutter 31. Consequently, a remarkable feature which is not found in the prior art can be realized in that the shutter 41 is allowed to slide in the insertion/removal direction of the plug 1 in conjunction with a usual operation by the user which is insertion/removal of the plug 1, thereby opening and closing the shutter 41 for the lens 21. Only the usual operation by the user which is insertion/removal of the plug 1 can satisfy both of that the shutter 41 is closed to protect the lens 21 at a time of non-insertion, and that the shutter 41 is opened to allow the lenses 11 and 21 to perform optical coupling to each other at a time of engagement. As a result, a possibility can be considerably reduced that foreign materials exert influence on the transmission of light conducted in the optical connector.

Also, unlike the optical connector in the prior art described above, the optical connector 100 of the present embodiment makes it possible to realize opening/closing operation of the shutter 41 in conjunction with the usual operation by the user which is insertion/removal of the plug 1, with an extremely simple structure having the smaller number of required parts as described above.

Figure 30:
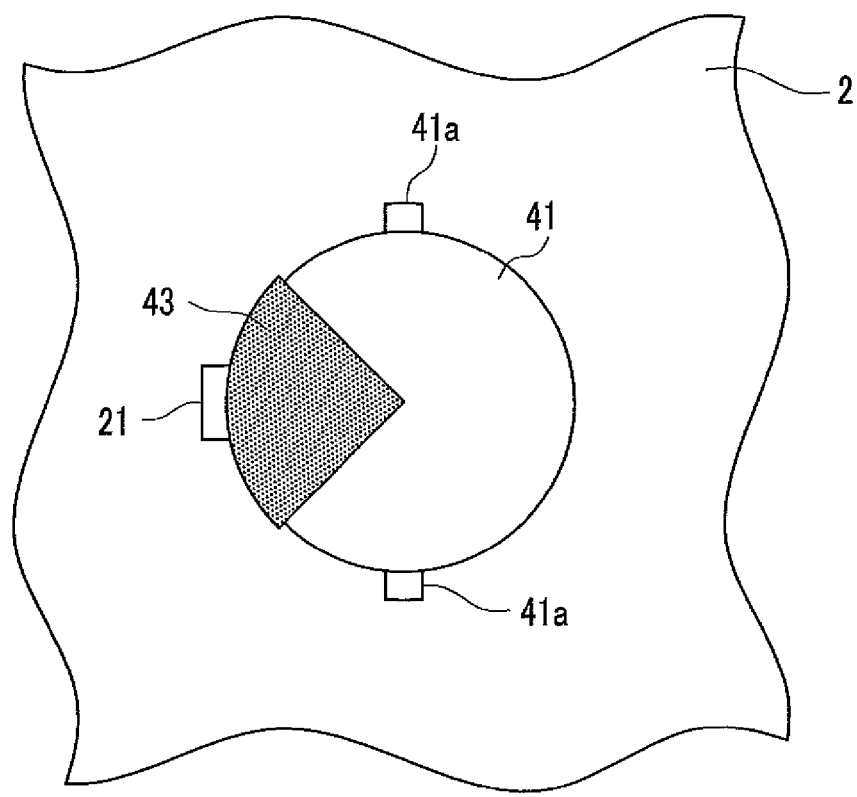
FIG. 30 is a view for explaining another example of the shutter provided in the jack, and corresponds to a cross-sectional view taken along the line C-C in FIG. 29A.
Figure 30:
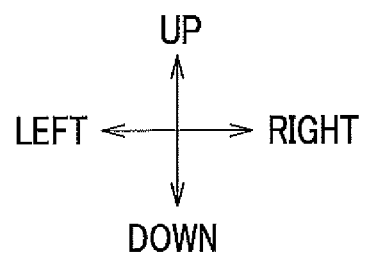

As shown in FIG. 30, as another example of the embodiment relating to the shutter 41, the shutter 41 is provided with a wiper 43 (jack-side wiper for shutter) that wipes in contact with the surface of the lens 21 during insertion/removal of the plug 1. The wiper 43 has the form of a fan and the apex of the wiper 43 coincides with the center of the shutter 41 having the form of circular column. The wiper 43 can be made from, for example, non-woven fabric. The wiper 43 is attached to the rear end of the shutter 41, for example, using an adhesive. A radius of the wiper 43 is slightly greater than a radius of the shutter 41.

When the plug 1 is inserted into the jack 2, the shutter 41 slides to the front direction. In doing so, since the wiper 43 is wound along the inner side surface of the jack 2, it can wipe the lens 21 which is to be exposed from the shutter 41, without hindering the insertion of the plug 1. Moreover, when the plug 1 is removed from the jack 2, the spring 42 allows the shutter 41 to slide to the rear direction. In doing so, since the wiper 43 is wound along the inner side surface of the jack 2, it can wipe the lens 21 which is to be covered by the shutter 41, without hindering the removal of the plug 1.

Accordingly, since the wiper 43 wipes the surface of the lens 21 by the opening/closing operation of the shutter 41 in conjunction with the usual operation by the user which is insertion/removal of the plug 1, foreign materials can be certainly removed from the lens 21.

Note that the form of the plug 1 is not limited to the form of circular column and may be the form of elliptical column, the form of quadrangular column, the form of trapezoidal column, or other forms. It is only necessary for the form of the plug accommodation section C of the jack 2 to conform to the form of the plug 1.

Also, an optical connector comprised of the plug 1 provided with shutter 31 and the jack 2 provided with shutter 41 can be realized to protect both of the lenses 11 and 21.

(Airflow Generation Mechanism Provided in Plug and Jack)

With reference to FIGS. 31A to 34B, description will be given of embodiments in which the plug 1 and/or the jack 2 are/is provided with an airflow generation mechanism for more certainly removing foreign materials from the optical coupling part. Note that in the embodiments, the optical coupling part provided on the plug 1 is a ball lens 112 and the optical coupling part provided on the jack 2 is a ball lens 212.

Figure 31A:
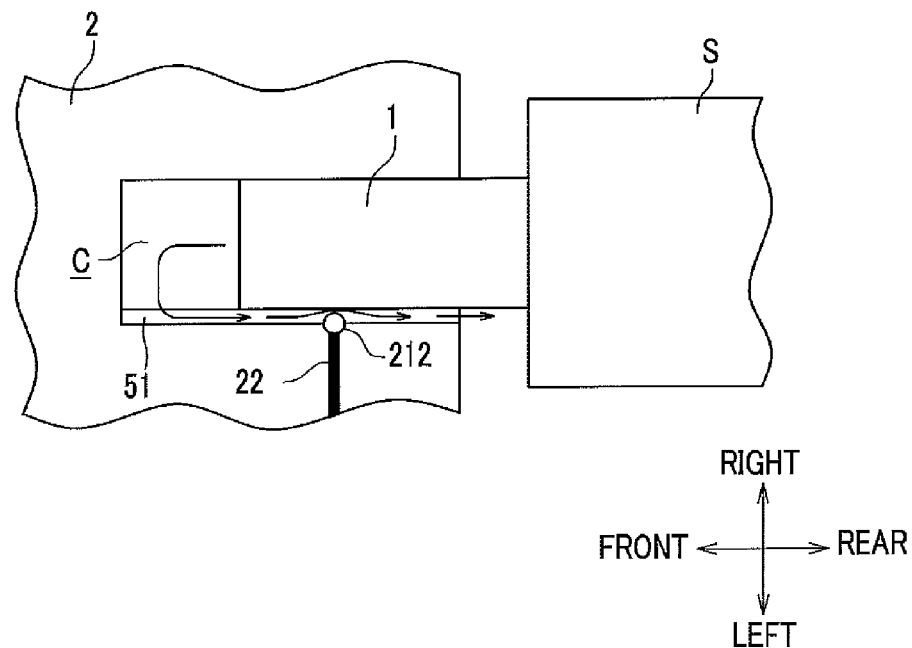
FIGS. 31A and 31B are schematic views showing an example of an airflow generation mechanism provided in the jack, in which FIG. 31A corresponds to a view when viewing the plug and the jack after insertion, from up above.
Figure 31B:
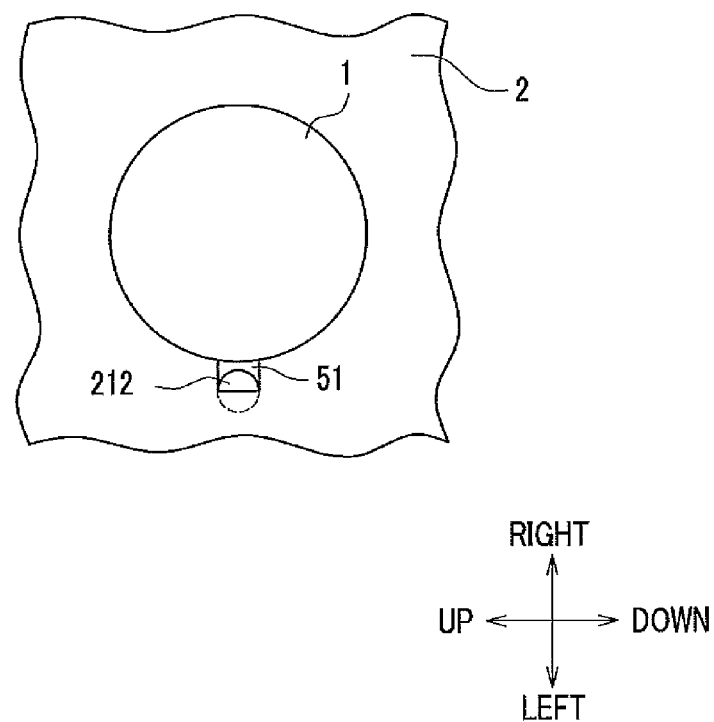

In the embodiment shown in FIGS. 31A and 31B, formed on the inner side surface of the jack 2 is a channel 51 for airflow (jack-side channel for airflow) that extends via the exposed surface of the ball lens 212 to the axial direction. The channel 51 for airflow extends from the entrance of the plug accommodation section C to the innermost portion thereof. However, if removal of foreign materials by airflow works well as described later, the channel 51 for airflow does not have to extend to the innermost portion. Note that the plug 1 shown in FIGS. 31A and 31B has the form of circular column and the plug accommodation section C of the jack 2 conforms to the form of the plug 1.

As shown in FIG. 31B, it is preferable that the depth of the channel 51 for airflow, namely the length in the right-left direction, is designed to be a little greater length than a radius of the ball lens 212. Also, it is preferable that the ball lens 212 is disposed so that nearly the right half of the ball lens 212 is exposed to inside the channel 51 for airflow. Moreover, it is preferable that the width of the channel 51 for airflow, namely the length in the up-down direction, is designed to be within the range of 80% to 100% of a diameter of the ball lens 212, in consideration of an effective beam path of the ball lens 212.

As shown in FIG. 31A, when the plug 1 is inserted into the jack 2 to the position immediately before the plug 1 and the jack 2 are engaged with each other, airflow due to insertion of the plug 1 is generated in the plug accommodation section C of the jack 2. Herein, since the diameter of the plug 1 and the hole diameter of the plug accommodation section C are nearly equal to each other, there is hardly any gap between the side surface of the plug 1 and the inner side surface of the jack 2 after the insertion, other than the region in which the channel 51 for airflow exists. If necessary, for example, a member similar to the wiper 33, 43 (see FIGS. 28A, 28B and 30) can be provided over the circumferential direction on the side surface of the plug 1 or the inner side surface of the jack 2, to block the above gap, thereby providing no air hole leading to the outside other than the channel 51 for airflow. Moreover, the shutter 31 (see FIGS. 27A to 27C) may be provided to obtain a similar advantageous effect.

As compared to the gap that originally exists between the side surface of the plug 1 and the inner side surface of the jack 2, the space in the channel 51 for airflow designed as described above is sufficiently large. Accordingly, airflow generated in the plug accommodation section C is concentrated on the front side of the ball lens 212 in the channel 51 for airflow. The concentrated airflow moves with a predetermined pressure through the channel 51 for airflow toward the rear direction to pass on the surface of the ball lens 212 to be discharged from the entrance of the plug accommodation section C to the outside (see the arrowed line shown in FIG. 31A).

Accordingly, airflow generated due to insertion of the plug 1 can blow away foreign materials adhering to the ball lens 212 to remove them. As a result, a possibility can be considerably reduced that the foreign materials exert influence on the transmission of light conducted in the optical connector. Since the above airflow is generated by only the usual operation by the user which is insertion of the plug 1, the user is not requested to perform any special operation.

Moreover, removal of foreign materials in the jack 2 can be realized at a timing of immediately before the engagement at which the removal of foreign materials becomes most useful. In other words, cleaning of the optical coupling part provided on the inner side surface of the jack 2, which is difficult for a general user to perform, can be performed by the insertion of the plug 1, i.e., the operation necessary for engagement of the plug 1 with the jack 2, at a most effective timing every time the engagement is performed.

Thus, it is the feature of the present invention in which the optical coupling parts are provided on the side surface of the plug 1 and the inner side surface of the jack 2 that only providing a very simple channel for airflow can realize the cleaning of the optical coupling part. As for the optical connector in the prior art in which the optical coupling part is provided on the tip of the plug, since the direction of airflow cannot be effectively controlled by such a simplified channel for airflow as described above, the surface of the optical coupling part cannot be cleaned by the airflow.

Herein, it is only necessary to arrange the ball lens 212 so that an exposed portion of the ball lens 212 present in the channel 51 for airflow is disposed on the inside of the inner side surface of the jack 2 (the side occupied by the jack 2: the left side in FIGS. 31A and 31B). In other words, it is only necessary to arrange the exposed portion of the ball lens 212 present in the channel 51 for airflow so that the apex portion on the right side of the ball lens 212 is located by a predetermined distance from the inner side surface of the jack 2, outward in the radial direction of the plug 1 having the form of circular column inserted into the jack 2 (recession of the ball lens 212 from the plug 1). According to this configuration, since the passage of airflow can be ensured in a suitable size between the apex portion on the right side of the ball lens 212 and the side surface of the plug 1, the airflow that is generated due to insertion of the plug 1 can more effectively blow away foreign materials adhering to the ball lens 212 to remove them.

Moreover, providing the ball lens 212 in the optical coupling part of the jack 2 allows the passage of airflow to narrow depending on the form of the ball lens 212. Accordingly, the flow rate at a time when the airflow passes by the ball lens 212 increases as compared to the flow rate before and after the airflow passes by the ball lens 212. Consequently, the airflow that passes between the ball lens 212 and the side surface of the plug 1 can more swiftly blow away foreign materials adhering to the ball lens 212 to remove them.

Note that the form of the plug 1 is not limited to the form of circular column and may be the form of elliptical column, the form of quadrangular column, the form of trapezoidal column, or other forms. It is only necessary for the form of the plug accommodation section C of the jack 2 to conform to the form of the plug 1.

Also, the form of the channel 51 for airflow is not limited to the linear form along the front-rear direction and may be other forms, for example, such as a spiral form.

Moreover, the optical coupling part which can be adopted in the present embodiment is not limited to the ball lens and can also be applied to, for example, a lens having a flat surface.

Figure 32A:
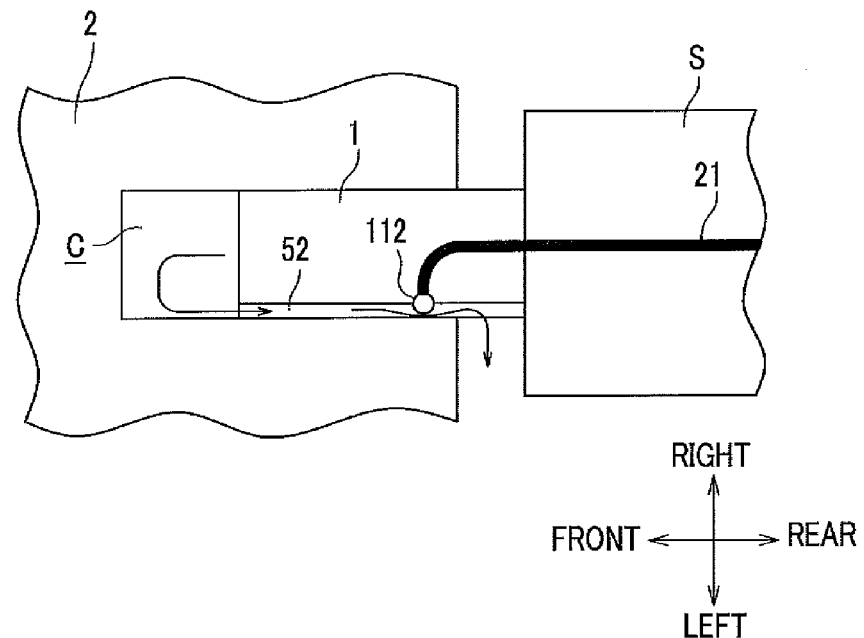
FIGS. 32A to 32C are schematic views showing an example of an airflow generation mechanism provided in the plug, in which FIG. 32A corresponds to a view when viewing the plug and the jack after insertion, from up above.
Figure 32B:
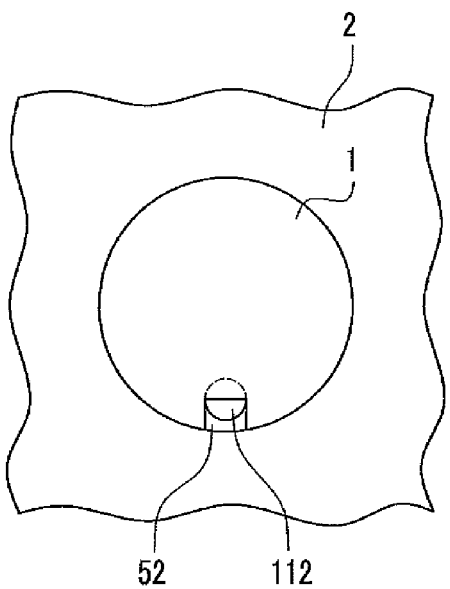
Figure 32C:
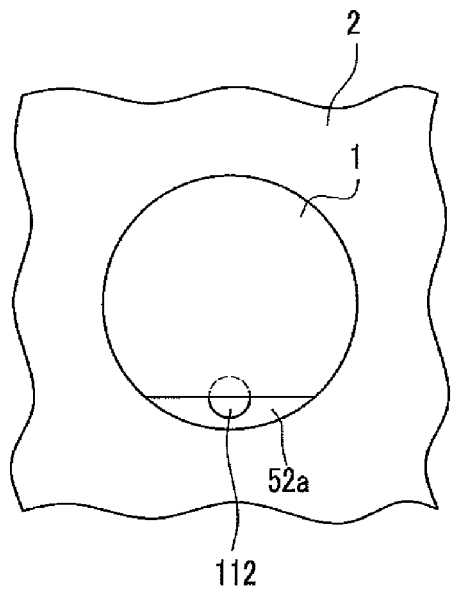

In the embodiment shown in FIGS. 32A to 32C, formed on the side surface of the plug 1 is a channel 52 for airflow (plug-side channel for airflow) that extends via the exposed surface of the ball lens 112 to the axial direction. The channel 52 for airflow extends from the tip of the plug 1 until it reaches the support part S. However, if removal of foreign materials by airflow works well as described later, the channel 52 for airflow does not have to extend until it reaches the support part S. Note that the plug 1 shown in FIGS. 32A and 32B has the form of circular column and the plug accommodation section C of the jack 2 conforms to the form of the plug 1.

As shown in FIG. 32B, it is preferable that the depth of the channel 52 for airflow, namely the length in the right-left direction, is designed to be a little greater length than a radius of the ball lens 112. Also, it is preferable that the ball lens 112 is disposed so that nearly the left half of the ball lens 112 is exposed to inside the channel 52 for airflow. Moreover, it is preferable that the width of the channel 52 for airflow, namely the length in the up-down direction, is designed to be within the range of 80% to 100% of a diameter of the ball lens 112, in consideration of an effective beam path of the ball lens 112.

As shown in FIG. 32A, when the plug 1 is inserted into the jack 2 to the position immediately before the plug 1 and the jack 2 are engaged with each other, airflow due to insertion of the plug 1 is generated in the plug accommodation section C of the jack 2. Herein, as is the case with the embodiment shown in FIG. 31A and FIG. 31B, there is hardly any gap between the side surface of the plug 1 and the inner side surface of the jack 2 after the insertion, other than the region in which the channel 52 for airflow exists. If necessary, for example, a member similar to the wiper 33, 43 (see FIGS. 28A, 28B and 30) can be provided over the circumferential direction on the side surface of the plug 1 or the inner side surface of the jack 2, to block the above gap, thereby providing no air hole leading to the outside other than the channel 52 for airflow. Moreover, the shutter 31 (see FIGS. 27A to 27C) may be provided to obtain a similar advantageous effect.

As compared to the gap that originally exists between the side surface of the plug 1 and the inner side surface of the jack 2, the space inside the channel 52 for airflow designed as described above is sufficiently large. Accordingly, airflow generated in the plug accommodation section C is concentrated on the front side of the ball lens 112 in the channel 52 for airflow. The concentrated airflow moves with a predetermined pressure through the channel 52 for airflow toward the rear direction to pass on the surface of the ball lens 112 to be discharged from the entrance of the plug accommodation section C to the outside (see the arrowed line shown in FIG. 32A).

Accordingly, airflow generated due to insertion of the plug 1 can blow away foreign materials adhering to the ball lens 112 to remove them. As a result, a possibility can be considerably reduced that the foreign materials exert influence on the transmission of light conducted in the optical connector. Since the above airflow is generated by only the usual operation by the user which is insertion of the plug 1, the user is not requested to perform any special operation.

Moreover, removal of foreign materials in the channel 52 for airflow of the plug 1 inserted into the jack 2 can be realized at a timing of immediately before the engagement at which the removal of foreign materials becomes most useful. Thus, it is the feature of the present invention in which the optical coupling parts are provided on the side surface of the plug 1 and the inner side surface of the jack 2 that only providing a very simple channel for airflow can realize the cleaning of the optical coupling part. As for the optical connector in the prior art in which the optical coupling part is provided on the tip of the plug, since the direction of airflow cannot be effectively controlled by such a simplified channel for airflow as described above, the surface of the optical coupling part cannot be cleaned by the airflow.

Herein, it is only necessary to arrange the ball lens 112 so that an exposed portion of the ball lens 112 present in the channel 52 for airflow is disposed on the inside of the side surface of the plug 1. In other words, it is only necessary to arrange the exposed portion of the ball lens 112 present in the channel 52 for airflow so that the apex portion on the left side of the ball lens 112 is located by a predetermined distance from the side surface of the plug 1, inward in the radial direction of the plug 1 having the form of circular column (recession of the ball lens 112 from the jack 2). According to this configuration, since the passage of airflow can be ensured in a suitable size between the apex portion on the left side of the ball lens 112 and the inner side surface of the jack 2, the airflow generated due to insertion of the plug 1 can more effectively blow away foreign materials adhering to the ball lens 112 to remove them.

Moreover, providing the ball lens 112 in the optical coupling part of the plug 1 allows the passage of airflow to narrow depending on the form of the ball lens 112. Accordingly, the flow rate at a time when the airflow passes by the ball lens 112 increases as compared to the flow rate before and after the airflow passes by the ball lens 112. Consequently, the airflow passing between the ball lens 112 and the inner side surface of the jack 2 can more swiftly blow away foreign materials adhering to the ball lens 112 to remove them.

Note that the form of the plug 1 is not limited to the form of circular column and may be the form of elliptical column, the form of quadrangular column, the form of trapezoidal column, or other forms. It is only necessary for the form of the plug accommodation section C of the jack 2 to conform to the form of the plug 1.

Also, the form of the channel 52 for airflow is not limited to the linear form along the front-rear direction and may be other forms, for example, such as a spiral form. Furthermore, as shown in FIG. 32C, a portion of the plug 1 having the form of circular column may be cut away along the front-rear direction to expose a portion of the ball lens 112, thereby ensuring the passage of airflow which forms a channel 52a for airflow.

Moreover, the optical coupling part which can be adopted in the present embodiment is not limited to the ball lens and can also be applied to, for example, a lens having a flat surface.

Figure 33A:
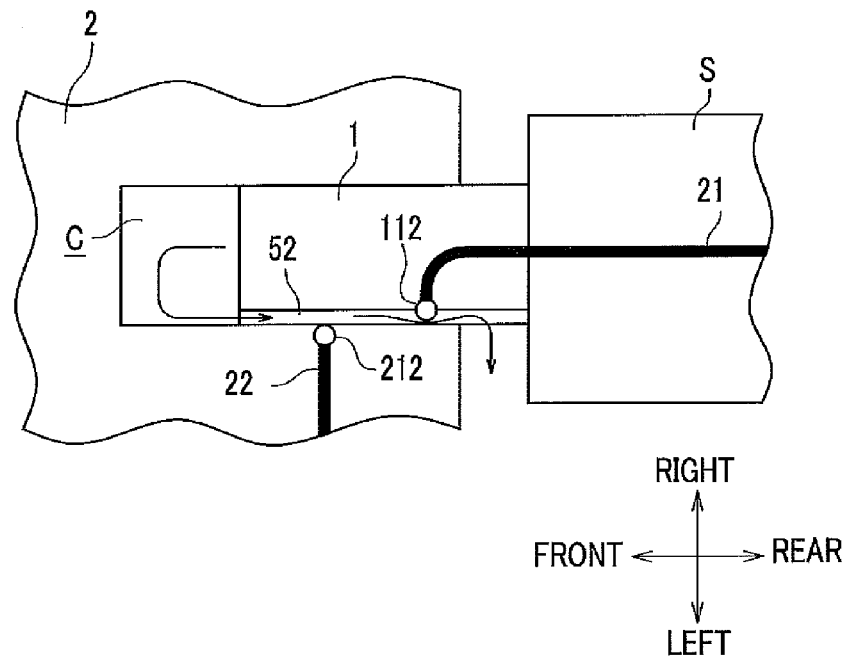
FIGS. 33A to 33C are schematic views showing another example of the airflow generation mechanism provided in the plug, in which FIG. 33A corresponds to a view when viewing the plug and the jack after insertion, from up above.
Figure 33B:
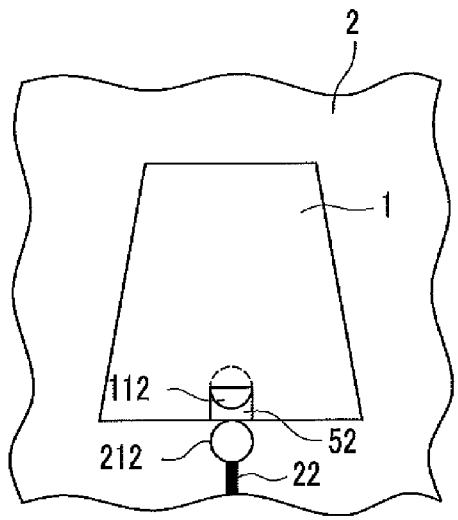
Figure 33C:
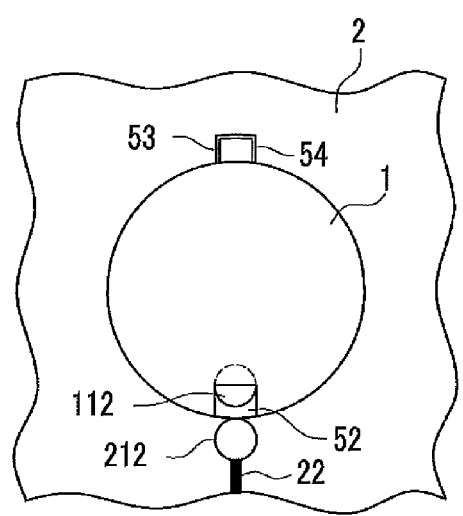

In the embodiment shown in FIGS. 33A to 33C, the plug 1 having the channel 52 for airflow is a modification of the plug 1 shown in FIGS. 32A to 32C and has the form of trapezoidal column (see FIG. 33B), not the form of circular column. The form of the plug accommodation section C of the jack 2 is the form corresponding to the form of trapezoidal column of the plug 1 shown in FIGS. 33A to 33C. Accordingly, the optical connector 100 constituted by the plug 1 and the jack 2 shown in FIGS. 33A to 33C can realize an angle fixing mechanism that fixes a position around the axis in the insertion/removal direction of the plug 1 relative to the jack 2. The form of the plug 1 and the form of the jack 2 determine the position around the axis in the insertion/removal direction of the plug 1 relative to the jack 2 from the time of start of insertion of the plug 1 until the time of engagement. In other words, the angle fixing mechanism can constantly maintain an angle of insertion in the circumferential direction of the plug 1.

In the same manner as in the case of the embodiment shown in FIGS. 32A to 32C, it is only necessary to arrange the ball lens 112 so that an exposed portion of the ball lens 112 present in the channel 52 for airflow is disposed on the inside of the side surface of the plug 1. In other words, it is only necessary to arrange the exposed portion of the ball lens 112 present in the channel 52 for airflow so that the apex portion on the left side of the ball lens 112 is located by a predetermined distance from the side surface of the plug 1, on the inside of the plug 1 having the form of trapezoidal column.

As shown in FIG. 33A, when the plug 1 is inserted into the jack 2 to the position immediately before the plug 1 and the jack 2 are engaged with each other, airflow due to insertion of the plug 1 is generated in the plug accommodation section C of the jack 2. In the same manner as in the case of the embodiment shown in FIGS. 32A to 32C, the airflow generated due to insertion of the plug 1 can blow away foreign materials adhering to the ball lens 112 to remove them.

Moreover, according to the configuration of FIGS. 33A to 33C, the angle fixing mechanism of the optical connector 100 allows the ball lens 212 of the jack 2 to be opened to the space in the channel 52 for airflow after insertion of the plug 1. Accordingly, airflow generated due to the insertion of the plug 1 passes not only on the surface of the ball lens 112 but also on the surface of the ball lens 212 to be discharged from the entrance of the plug accommodation section C to the outside (see the arrowed line shown in FIG. 33A). Therefore, the airflow generated due to the insertion of the plug 1 can blow away not only foreign materials adhering to the ball lens 112 but also foreign materials adhering to the ball lens 212 to remove them. As a result, a possibility can be considerably reduced that the foreign materials exert influence on the transmission of light conducted in the optical connector.

In other words, the configuration in which the plug 1 is provided with a single channel which is the channel 52 for airflow makes it possible to perform both cleaning of the optical coupling part provided on the inner side surface of the jack 2 and cleaning of the optical coupling part provided on the side surface of the plug 1, which are difficult for a general user to perform, by the insertion of the plug 1, i.e., the operation necessary for engagement of the plug 1 with the jack 2, every time the engagement is performed.

Note that as shown in FIG. 33C, as the angle fixing mechanism of the optical connector 100, a key mechanism may be adopted in which the plug 1 is provided with a key 53 that is provided on the right side in the circumferential direction and extends outward in the radial direction, and the jack 2 is provided with a key groove 54 that conforms to the key 53. The key 53 is formed on the side surface of the plug 1 to extend from the tip of the plug 1 until it reaches the support part S. The key groove 54 can accommodate the entire key 53 at a time of engagement. When the above key mechanism is adopted and the plug 1 is inserted into the jack 2, in the same manner as the configuration shown in FIGS. 33A and 33B, airflow generated due to insertion of the plug 1 can blow away not only foreign materials adhering to the ball lens 112 but also foreign materials adhering to the ball lens 212 to remove them.

Note that the embodiment shown in FIGS. 31A and 31B in which the jack 2 is provided with the channel 51 for airflow may be configured so that the above angle fixing mechanism is provided in the plug 1 and the jack 2. By this configuration, airflow generated due to insertion of the plug 1 can blow away not only foreign materials adhering to the ball lens 212 but also foreign materials adhering to the ball lens 112 to remove them. Accordingly, cleaning of the optical coupling part provided on the inner side surface of the jack 2 and cleaning of the optical coupling part provided on the side surface of the plug 1 can be realized together.

Figure 34A:
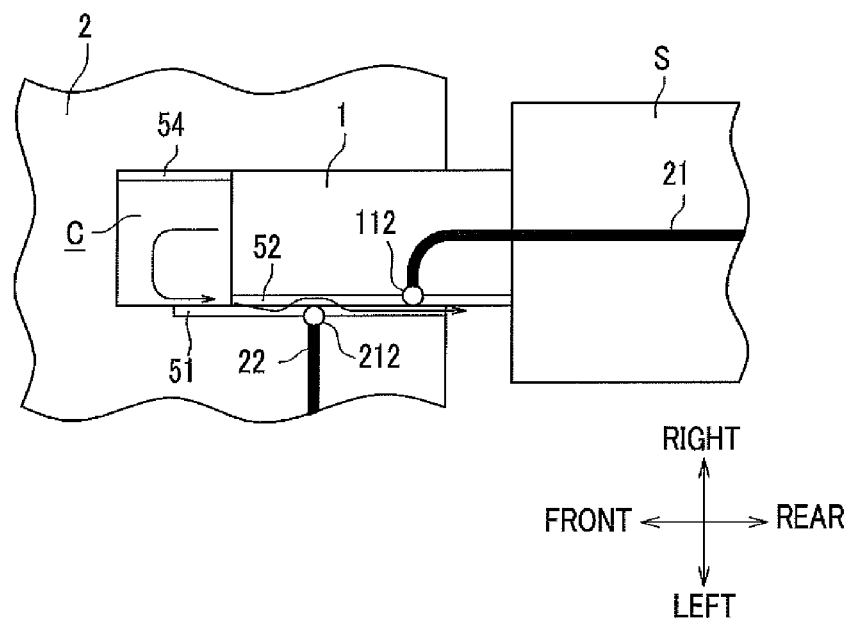
FIGS. 34A and 34B are schematic views showing an example of combination of an airflow generation mechanism provided in the plug and an airflow generation mechanism provided in the jack, in which FIG. 34A corresponds to a view when viewing the plug and the jack after insertion, from up above.
Figure 34B:
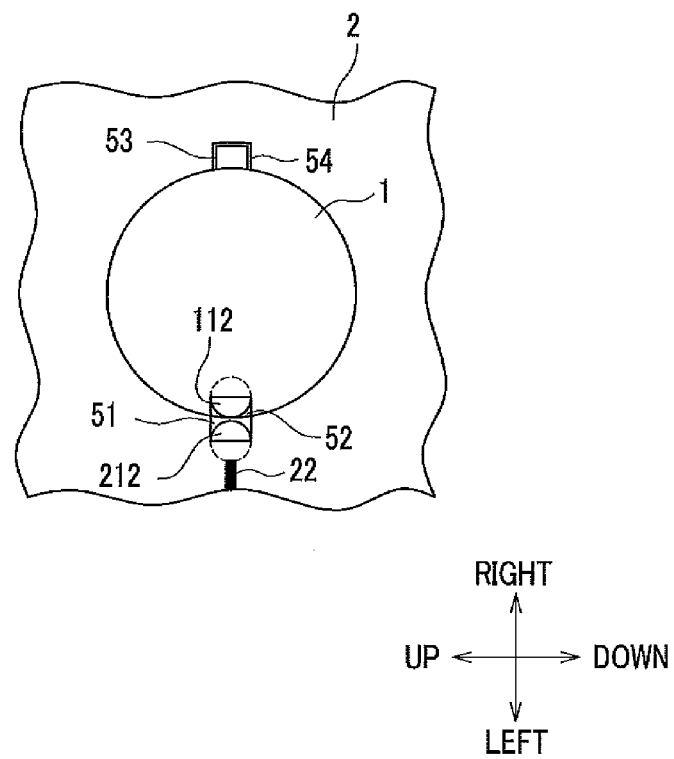

In the embodiment shown in FIGS. 34A and 34B, the plug 1 includes the channel 51 for airflow which is explained in the embodiment shown in FIGS. 31A and 31B, and the jack 2 includes the channel 52 for airflow which is explained in the embodiment of FIGS. 32A to 32C. Moreover, in the same manner as in the embodiment shown in FIG. 33C, the plug 1 includes the key 53 that is formed to extend from the tip of the plug 1 until it reaches the support part S, and the jack 2 includes the key groove 54 that conforms to the key 53, thereby realizing the angle fixing mechanism of the optical connector 100.

As shown in FIG. 34A, when the plug 1 is inserted into the jack 2 to the position immediately before the plug 1 and the jack 2 are engaged with each other, airflow due to insertion of the plug 1 is generated in the plug accommodation section C of the jack 2. Herein, the key 53 and the key groove 54 determine the position around the axis of the plug 1 inserted into the jack 2. Accordingly, the channel 51 for airflow and the channel 52 for airflow can be faced each other at all times after insertion of the plug 1, thereby making it possible to form a space unified by the channel 51 for airflow and the channel 52 for airflow.

As compared to the gap that originally exists between the side surface of the plug 1 and the inner side surface of the jack 2, the unified space designed as described above is sufficiently large. Accordingly, airflow generated in the plug accommodation section C is concentrated on the front side of the ball lens 212 in the channel 51 for airflow. The concentrated airflow moves with a predetermined pressure through the unified space toward the rear direction to pass on the surfaces of the ball lenses 112 and 212 to be discharged from the entrance of the plug accommodation section C to the outside (see the arrowed line shown in FIG. 34A).

Accordingly, airflow generated due to the insertion of the plug 1 can blow away not only foreign materials adhering to the ball lens 112 but also foreign materials adhering to the ball lens 212 to remove them. As a result, a possibility can be considerably reduced that the foreign materials exert influence on the transmission of light conducted in the optical connector.

In the embodiment shown in FIGS. 34A and 34B, the ball lens 112 can be disposed inside the plug 1 and the ball lens 212 can be disposed inside the jack 2 so that, as shown in FIG. 34B, the exposed portion of the ball lens 112 present in the channel 52 for airflow and the exposed portion of the ball lens 212 present in the channel 51 for airflow come close to within a very small distance at a time of engagement. More specifically, the ball lens 112 can be disposed inside the plug 1 so that the apex portion on the left side of the ball lens 112 is located slightly inward from the side surface of the plug 1. Also, the ball lens 212 can be disposed inside the jack 2 so that the apex portion on the right side of the ball lens 212 is located slightly inward from the inner side surface of the jack 2 (on the side occupied by the jack 2).

Even where the ball lens 112 is disposed to almost block the channel 52 for airflow of the plug 1 as described above, the channel 51 for airflow provided on the jack 2, which partially faces the channel 52 for airflow during the insertion of the plug 1, functions as the passage of airflow (see FIG. 34A). Accordingly, airflow generated due to the insertion of the plug 1 can blow away foreign materials adhering to the ball lens 112 to remove them.

In the same way, even where the ball lens 212 is disposed to almost block the channel 51 for airflow of the jack 2 as described above, the channel 52 for airflow provided on the plug 1, which partially faces the channel 51 for airflow during the insertion of the plug 1, functions as the passage of airflow (see FIG. 34A). Accordingly, airflow generated due to the insertion of the plug 1 can blow away foreign materials adhering to the ball lens 212 to remove them.

Moreover, according to the embodiment shown in FIGS. 34A and 34B in which both of the plug 1 and the jack 2 are provided with the channel for airflow 51, 52, the ball lenses 112 and 212 can be brought close to each other at the time of engagement, as compared to the case such as shown in FIGS. 31A to 33C in which either of the plug 1 or the jack 2 is provided with the channel for airflow. In general, the smaller the distance between two optical coupling parts at a time of engagement becomes, the more the efficiency in optical coupling improves. Therefore, according to the embodiment shown in FIGS. 34A and 34B, the efficiency in optical coupling between the ball lenses 112 and 212 can be further improved.

Cleaning action to remove foreign materials adhering to the ball lenses 112, 212 works until immediately before the ball lenses 112, 212 face each other, namely until immediately before the plug 1 and the jack 2 are engaged with each other. Consequently, the foreign materials adhering to the ball lenses 112, 212 can be removed until a timing of immediately before the engagement at which removal of the foreign materials becomes most useful.

Note that even where the channel 51 for airflow of the jack 2 does not sufficiently function as the passage of airflow, the channel 52 for airflow of the plug 1 can function as the passage of airflow to maintain the cleaning action for removal of foreign materials. Accordingly, as shown in FIG. 34A, the channel 51 for airflow need not extend to the innermost portion of the plug accommodation section C. Moreover, as compared to the embodiments shown in FIGS. 31A to 33C, the length of the channel 51 for airflow extending from the entrance of the plug accommodation section C to the front direction can be further reduced. More specifically, it is only necessary for the channel 51 for airflow to extend to slightly the front of the ball lens 212.

<<Other>>

Considering the optical transmission characteristics, it is preferable that the optical fiber 12 in the plug 1 is linearly arranged. However, as long as light can be transmitted to the optical coupling part such as the lens 11, the optical fiber 12 can be bent to an arbitrary form to be arranged in the plug 1. In the case of a two-core optical connector, two optical fibers present in two plugs which are unified can be arranged to intersect with each other to extend toward the optical coupling part on the side surface of the corresponding plug. This configuration eliminates the need to bend the optical fibers too much, thereby making it possible to suppress deterioration in the optical transmission characteristics. Note that the same also applies to the optical fiber 22 in the jack 2.

When the light transmitted inside the plug 1 is transmitted to the optical coupling part such as the lens 11, the light directed to the lens 11 may enter the side surface of the lens 11 not only perpendicularly but also obliquely. In other words, the optical fiber 12 or the optical path conversion part 18 can be arranged to allow the light to enter the side surface of the lens 11 obliquely. Even this configuration can realize optical coupling between the lens 11 and the lens 21 of the jack 2. With this configuration, influence by reflected light at the optical coupling part can be reduced. Note that the same also applies to the optical coupling part such as the lens 21 of the jack 2.

In the embodiment shown in FIGS. 27A to 27C, the spring 32 provided in the plug 1 can be replaced with a magnet (plug-side urging part). This enables the shutter 31 of the plug 1 to slide in the front-rear direction by urging action of the magnet, not by the urging action of the spring 32. Also, the spring 32 and the above magnet may be used together.

Moreover, in the embodiment shown in FIGS. 29A to 29F, the spring 42 provided in the jack 2 can be replaced with a magnet (jack-side urging part). This enables the shutter 41 of the jack 2 to slide in the front-rear direction by urging action of the magnet, not by the urging action of the spring 42. Also, the spring 42 and the above magnet may be used together.

Furthermore, an optical connector can be realized which incorporates thereinto both of the shutter which is explained in the embodiments shown in FIG. 27A to FIG. 30 and the channel for airflow which is explained in the embodiments shown in FIG. 31A to FIG. 34B.

In addition, a technique can be realized which appropriately combines together various techniques explained in the embodiments.

Other forms, materials and functions of the constituent elements of the present invention can be appropriately modified within the scope not departing from the gist of the present invention.

REFERENCE SIGNS LIST

100 Optical connector
1 Plug (Plug for optical connector)
2 Jack (Jack for optical connector)
11 Lens (Plug-side optical coupling part)
12 Optical fiber (Plug-side optical waveguide unit)
13 Protection part (Plug-side protection part)
15 Spring
18 Optical path conversion part
19 Wiper (Plug-side wiper)
21 Lens (Jack-side optical coupling part)
22 Optical fiber (Jack-side optical waveguide unit)
23 Protection part (Jack-side protection part)
25 Spring
29 Wiper (Jack-side wiper)
31 Shutter (Plug-side shutter)
32 Spring (Plug-side urging part)
33 Wiper (Plug-side wiper for shutter)
41 Shutter (Jack-side shutter)
42 Spring (Jack-side urging part)
43 Wiper (Jack-side wiper for shutter)
51 Channel for airflow (Jack-side channel for airflow)
52 Channel for airflow (Plug-side channel for airflow)
111 Ball lens
211 Ball lens

We claim:

1. A plug for an optical connector, comprising:
a plug-side optical waveguide unit held by the plug;
a plug-side optical coupling part that optically couples light transmitted inside the plug-side optical waveguide unit, to a jack, the plug-side optical coupling part being disposed on a side surface of the plug;
a plug-side shutter into which the plug is inserted and which slides on the side surface of the plug; and
a plug-side urging part that urges the plug-side shutter to an insertion direction of the plug, wherein
at a time of non-insertion of the plug, the plug-side shutter is urged by the plug-side urging part to be at a position to cover the plug-side optical coupling part, and
at a time of insertion of the plug, the plug-side shutter abuts on a periphery of an entrance of a plug accommodation section of the jack to slide to a removal direction of the plug to be at a position to expose the plug-side optical coupling part.

2. The plug for an optical connector, according to claim 1, wherein
the plug-side optical coupling part is configured to have a plug-side protection part that is disposed on the side surface of the plug and allows the light transmitted inside the plug-side optical waveguide unit to transmit therethrough.

3. The plug for an optical connector, according to claim 1, wherein
the plug-side optical coupling part includes:
a ball lens that optically couples the light transmitted inside the plug-side optical waveguide unit, to the jack; and
a spring that urges the ball lens outward in a direction nearly perpendicular to an insertion/removal direction of the plug, and wherein
a latch portion is formed on the side surface of the plug, the latch portion latching together the ball lens from outward in the direction nearly perpendicular to the insertion/removal direction of the plug, and
the ball lens urged by the spring outward in the direction nearly perpendicular to the insertion/removal direction of the plug is latched together by the latch portion and a portion of the ball lens is exposed to the side surface of the plug.

4. The plug for an optical connector, according to claim 1, further comprising
an optical path conversion part that is disposed between an end portion of the plug-side optical waveguide unit and the plug-side optical coupling part and converts an optical path of light transmitted from the end portion of the plug-side optical waveguide unit to transmit the light to the plug-side optical coupling part, or converts an optical path of light transmitted from the plug-side optical coupling part to transmit the light to the end portion of the plug-side optical waveguide unit.

5. The plug for an optical connector, according to claim 4, wherein
the optical path conversion part converts the optical path of light emitted from the end portion of the plug-side optical waveguide unit and parallel to the insertion/removal direction of the plug, to the direction nearly perpendicular to the insertion/removal direction of the plug.

6. The plug for an optical connector, according to claim 1, further comprising
a plug-side wiper that is disposed on the side surface of the plug at a front of the plug-side optical coupling part with respect to an insertion/removal direction of the plug and makes contact with a surface of a jack-side optical coupling part provided in the jack when the plug is inserted into or removed from the jack.

7. The plug for an optical connector, according to claim 1, wherein
the plug-side shutter includes a plug-side wiper for shutter that slides on the side surface of the plug to make contact with a surface of the plug-side optical coupling part.

8. The plug for an optical connector, according to claim 1, further comprising
a plug-side channel for airflow that is provided on the side surface of the plug and extends from a tip of the plug via an exposed surface of the plug-side optical coupling part to the side of a removal direction of the plug, wherein
airflow generated in the plug accommodation section of the jack due to insertion of the plug into the jack passes through the plug-side channel for airflow.

9. A jack for an optical connector, comprising:
a jack-side optical waveguide unit held by the jack;
a jack-side optical coupling part that optically couples light transmitted inside the jack-side optical waveguide unit, to a plug, the jack-side optical coupling part being disposed on an inner side surface of the jack;

a jack-side shutter that is disposed in a plug accommodation section of the jack and slides on the inner side surface of the jack; and
a jack-side urging part that urges the jack-side shutter to a removal direction of the plug, wherein
at a time of non-insertion of the plug, the jack-side shutter is urged by the jack-side urging part to be at a position to cover the jack-side optical coupling part, and
at a time of insertion of the plug, the jack-side shutter abuts on the plug inserted to slide to an insertion direction of the plug to be at a position to expose the jack-side optical coupling part.

10. The jack for an optical connector, according to claim 9, wherein
the jack-side optical coupling part is configured to have a jack-side protection part that is disposed on the inner side surface of the jack and allows the light transmitted inside the jack-side optical waveguide unit to transmit therethrough.

11. The jack for an optical connector, according to claim 9, wherein
the jack-side optical coupling part includes:
a ball lens that optically couples the light transmitted inside the jack-side optical waveguide unit, to the plug; and
a spring that urges the ball lens to an outside of the inner side surface of the jack, and wherein
a latch portion is formed on the inner side surface of the jack, the latch portion latching together the ball lens from the outside of the inner side surface of the jack, and
the ball lens urged by the spring to the outside of the inner side surface of the jack is latched together by the latch portion and a portion of the ball lens is exposed to the inner side surface of the jack.

12. The jack for an optical connector, according to claim 9, further comprising
a jack-side wiper that is disposed on the inner side surface of the jack at the rear of the jack-side optical coupling part with respect to an insertion/removal direction of the plug and makes contact with a surface of a plug-side optical coupling part provided in the plug when the plug is inserted into or removed from the jack.

13. The jack for an optical connector, according to claim 9, wherein
the jack-side shutter includes a jack-side wiper for shutter that slides on the inner side surface of the jack to make contact with a surface of the jack-side optical coupling part.

14. The jack for an optical connector, according to claim 9, further comprising
a jack-side channel for airflow that is provided on the inner side surface of the jack and extends from an entrance of a plug accommodation section of the jack via an exposed surface of the jack-side optical coupling part to the side of an insertion direction of the plug, wherein
airflow generated in the plug accommodation section of the jack due to insertion of the plug into the jack passes through the jack-side channel for airflow.

15. An optical connector provided with a plug and a jack for the optical connector, comprising:
a plug-side optical coupling part that optically couples light transmitted inside a plug-side optical waveguide unit held by the plug, to the jack, the plug-side optical coupling part being disposed on a side surface of the plug;

a jack-side optical coupling part that optically couples light transmitted inside a jack-side optical waveguide unit held by the jack, to the plug, the jack-side optical coupling part being disposed on an inner side surface of the jack; and
at least one of a first configuration and a second configuration, wherein
the first configuration includes a plug-side shutter into which the plug is inserted and which slides on the side surface of the plug; and a plug-side urging part that urges the plug-side shutter to an insertion direction of the plug, wherein at a time of non-insertion of the plug, the plug-side shutter is urged by the plug-side urging part to be at a position to cover the plug-side optical coupling part, and at a time of insertion of the plug, the plug-side shutter abuts on a periphery of an entrance of a plug accommodation section of the jack to slide to a removal direction of the plug to be at a position to expose the plug-side optical coupling part, and
the second configuration includes a jack-side shutter that is disposed in the plug accommodation section of the jack and slides on the inner side surface of the jack; and a jack-side urging part that urges the jack-side shutter to a removal direction of the plug, wherein at a time of non-insertion of the plug, the jack-side shutter is urged by the jack-side urging part to be at a position to cover the jack-side optical coupling part, and at a time of insertion of the plug, the jack-side shutter abuts on the plug inserted to slide to an insertion direction of the plug to be at a position to expose the jack-side optical coupling part.

16. The optical connector according to claim 15, wherein
the plug-side optical coupling part is configured to have a plug-side protection part that is disposed on the side surface of the plug and allows the light transmitted inside the plug-side optical waveguide unit to transmit therethrough, and
the jack-side optical coupling part is configured to have a jack-side protection part that is disposed on the inner side surface of the jack and allows the light transmitted inside the jack-side optical waveguide unit to transmit therethrough.

17. The optical connector according to claim 15, wherein
the plug includes a plug-side wiper that is disposed on the side surface of the plug at the front of the plug-side optical coupling part with respect to an insertion/removal direction of the plug and makes contact with a surface of the jack-side optical coupling part when the plug is inserted into or removed from the jack, and
the jack includes a jack-side wiper that is disposed on the inner side surface of the jack at the rear of the jack-side optical coupling part with respect to the insertion/removal direction of the plug and makes contact with a surface of the plug-side optical coupling part when the plug is inserted into or removed from the jack.

18. The optical connector according to claim 15, further comprising:
an angle fixing mechanism that fixes a position around the axis in an insertion/removal direction of the plug relative to the jack; and
at least one configuration of a configuration in which the plug includes a plug-side channel for airflow that is provided on the side surface of the plug and extends from a tip of the plug via a surface of the plug-side optical coupling part to the side of a removal direction of the plug, and a configuration in which the jack includes a jack-side channel for airflow that is provided on the inner side surface of the jack and extends from an entrance of a plug accommodation section of the jack via a surface of the jack-side optical coupling part to the side of an insertion direction of the plug, wherein airflow generated in the plug accommodation section of the jack due to insertion of the plug into the jack passes through at least one of the plug-side channel for airflow and the jack-side channel for airflow.

19. The optical connector according to claim 15, wherein the jack-side shutter includes a jack-side wiper for shutter that slides on the inner side surface of the jack to make contact with a surface of the jack-side optical coupling part.

\* \* \* \* \*